(12) United States Patent
Fludger et al.

(10) Patent No.: US 9,967,027 B2
(45) Date of Patent: May 8, 2018

(54) OPTICAL TRANSCEIVER COMPENSATION, MONITORING AND ALARMING

(71) Applicant: Cisco Technology, Inc., San Jose, CA (US)

(72) Inventors: Christopher R. Fludger, Nuremberg (DE); Soeren Gehrke, Nuremberg (DE); Johann B. Schiessl, Lauf an der Pegnitz (DE)

(73) Assignee: Cisco Technology, Inc., San Jose, CA (US)

( * ) Notice: Subject to any disclaimer, the term of this patent is extended or adjusted under 35 U.S.C. 154(b) by 0 days. days.

(21) Appl. No.: 15/210,224

(22) Filed: Jul. 14, 2016

(65) Prior Publication Data

US 2018/0019812 A1    Jan. 18, 2018

(51) Int. Cl.
| | |
|---|---|
| *H04B 10/08* | (2006.01) |
| *H04B 10/00* | (2013.01) |
| *H04B 10/06* | (2006.01) |
| *H04B 10/079* | (2013.01) |
| *H04B 10/67* | (2013.01) |
| *H04B 10/50* | (2013.01) |

(52) U.S. Cl.
CPC ......... *H04B 10/0795* (2013.01); *H04B 10/50* (2013.01); *H04B 10/67* (2013.01)

(58) Field of Classification Search
None
See application file for complete search history.

(56) References Cited

U.S. PATENT DOCUMENTS

| | | | |
|---|---|---|---|
| 7,302,186 B2 | 11/2007 | Light et al. | |
| 7,558,479 B1 * | 7/2009 | Robinson | H04B 10/0795 398/13 |
| 7,636,525 B1 * | 12/2009 | Bontu | H04B 10/60 398/208 |
| 7,684,699 B2 | 3/2010 | Schmuck et al. | |
| 8,670,680 B2 * | 3/2014 | Tanaka | H04B 10/6161 398/208 |
| 8,792,785 B2 | 7/2014 | Jiang et al. | |

(Continued)

OTHER PUBLICATIONS

Trung-Hien Nguyen et al., "Joint Simple Blind IQ Imbalance Compensation and Adaptive Equalization for 16-QAM Optical Communications", 2015 IEEE International Conference on Communications (ICC), Jun. 8-12, 2015, London, ISSN: 1550-3607, DOI: 10.1109/ICC.2015.7249101, pp. 4913-4918, 6 pages.

N. Stojanovic et al., "An Efficient Method for Skew Estimation and Compensation in Coherent Receivers", IEEE Photonics Technology Letters, vol. 28, No. 4, Feb. 15, 2016, pp. 489-492, 4 pages.

(Continued)

*Primary Examiner* — Oommen Jacob
(74) *Attorney, Agent, or Firm* — Edell, Shapiro & Finnan, LLC

(57) ABSTRACT

One or more operational parameters associated with pluggable optical transceivers are estimated to mitigate impairments to an optical signal caused by imperfections in the optical transceivers. A monitoring algorithm within a receiver signal processor may further use the estimated operational parameters associated with the pluggable optical transceivers to determine whether the transceivers are performing correctly. If the monitoring algorithm determines that either the transmitting or receiving optical transceiver is not functioning correctly, it may generate an alarm signal to notify a system administrator about the damaged device.

25 Claims, 26 Drawing Sheets

(56) References Cited

U.S. PATENT DOCUMENTS

| | | |
|---|---|---|
| 8,837,934 B2 | 9/2014 | Shih |
| 8,886,033 B2 | 11/2014 | Azadeh |
| 9,071,349 B2 | 6/2015 | El-Ahmadi et al. |
| 2005/0047802 A1* | 3/2005 | Jaynes ............... H04B 10/2513 398/208 |
| 2008/0032660 A1* | 2/2008 | Clark ...................... H04B 1/30 455/323 |
| 2009/0097866 A1* | 4/2009 | Nakamura ............ H04B 10/66 398/208 |
| 2010/0209121 A1 | 8/2010 | Tanimura |
| 2011/0135301 A1* | 6/2011 | Myslinski ........... H04B 10/572 398/34 |
| 2011/0205531 A1* | 8/2011 | Ohtani ................ G01M 11/335 356/73.1 |
| 2013/0084080 A1 | 4/2013 | Shibutani |
| 2013/0188965 A1* | 7/2013 | Afriat .................... H04B 10/60 398/136 |
| 2014/0341587 A1 | 11/2014 | Nakashima et al. |

OTHER PUBLICATIONS

G. Khanna "Joint Adaptive Pre-Compensation of Transmitter I/Q Skew and Frequency Response for High Order Modulation Formats and High Baud Rates", Optical Fiber Communication Conference, Mar. 22-26, 2015, Los Angeles, CA, ISBN: 978-1-55752-937-4, 3 pages.

Seb J. Savory, "Digital Coherent Optical Receivers: Algorithms and Subsystems", IEEE Journal of Selected Topics in Quantum Electronics, vol. 16, No. 5, Sep./Oct. 2010, pp. 1164-1179, 16 pages.

Faruk, et al., "Compensation for In-Phase/Quadrature Imbalance in Coherent-Receiver Front End for Optical Quadrature Amplitude Modulation", IEEE Photonics Journal, IEEE Photonics Society Publication, vol. 5, No. 2, Apr. 2013, 12 pgs.

Xu, et al., "Chromatic dispersion compensation in coherent transmission system using digital filters", Optical Society of America, vol. 18, No. 15 / Optics Express, Jul. 16, 2010, 16 pgs.

International Search Report and Written Opinion in counterpart International Application No. PCT/US2017/041293, dated Oct. 5, 2017.

\* cited by examiner

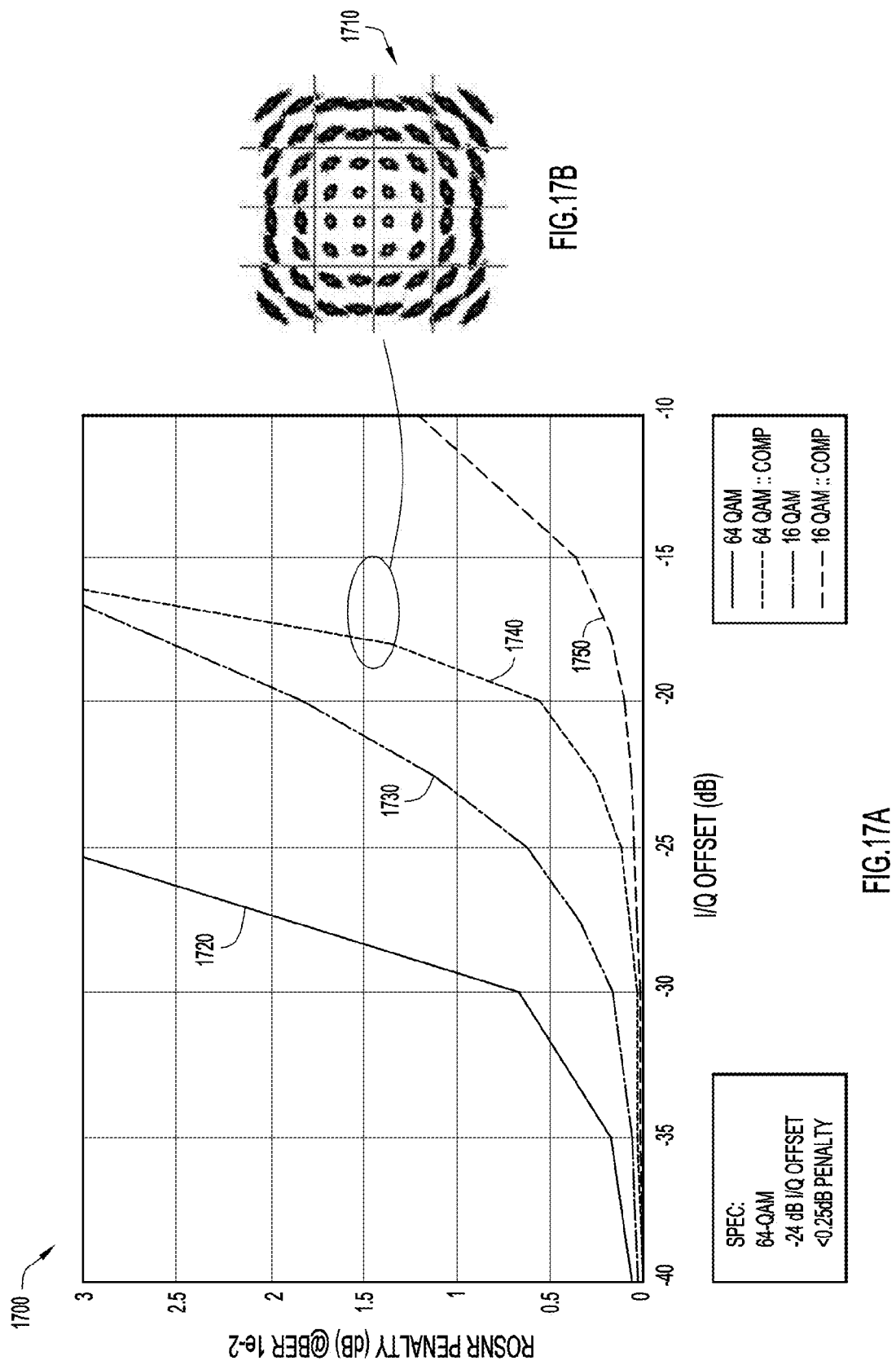

OPTICAL TRANSCEIVER COMPENSATION, MONITORING AND ALARMING

TECHNICAL FIELD

The present disclosure relates to monitoring the performance of, and compensating impairments in optical transceivers in an optical communication system.

BACKGROUND

To reduce costs, while providing flexibility and scalability, optical communication systems often employ pluggable optical transceiver modules. Some optical communication systems, however, operate at high baud-rates, making overall performance very sensitive to component tolerances. For example, at a baud-rate of 64 Gbaud, an optical symbol is only 15 picoseconds in duration. Component tolerances therefore must be accurate to within a fraction of a millimeter. Accordingly, it may be necessary to identify, in real-time, pluggable optical transceivers that are defective, or not within specification tolerances.

BRIEF DESCRIPTION OF THE DRAWINGS

FIGS. 17A and 17B illustrate simulation results showing improvements in optical noise penalty due to operations performed to compensate for IQ offset errors due to receiver imperfections, according to an example embodiment.

DESCRIPTION OF EXAMPLE EMBODIMENTS

In accordance with one embodiment, a method and system are presented herein to estimate one or more parameters associated with an optical transmitter and an optical receiver, signaling an alarm if the one or more estimated parameters are outside predetermined threshold levels, and to compensate a received optical signal for impairments related to the one or more transmitter and receiver parameters. In so doing, the disclosed method and system minimizes received signal distortion due to transceiver impairments and allows system administrators to identify and replace, in real-time, defective optical transceivers, reducing the costs conventionally associated with optical communication system outages.

Example Embodiments

Figure 1:
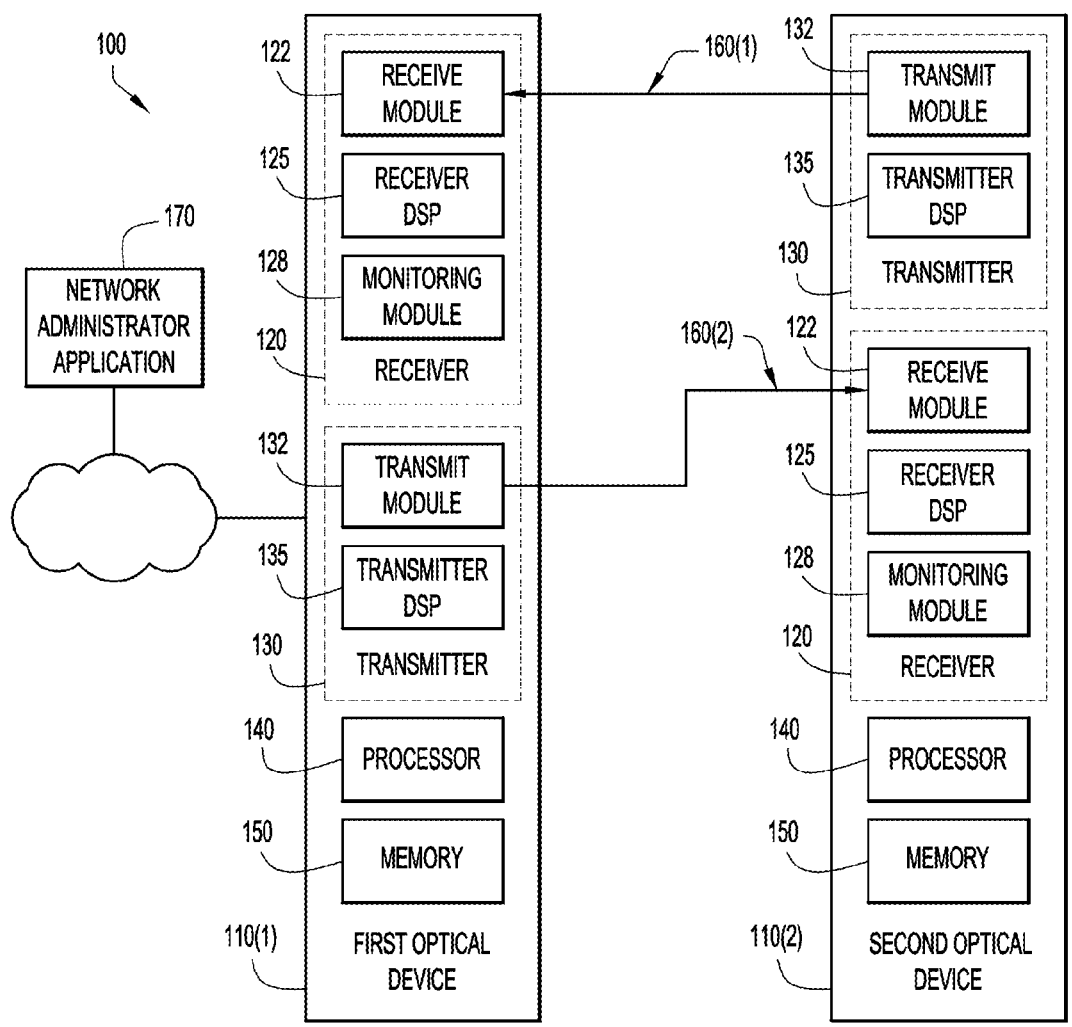
FIG. 1 is a block diagram illustrating an optical communication system in which the performance of pluggable optical transceiver modules is monitored and compensated, according to an example embodiment.

With reference first to FIG. 1, a block diagram is shown of an optical communication system 100 in which the performance of pluggable optical transceiver modules are monitored and compensated, according to an example embodiment. System 100 may comprise a first optical device 110(1), a second optical device 110(2) and optical channels (e.g., optical fibers) 160(1)-160(2). Each optical device 110(1) and 110(2) may comprise receiver 120, transmitter 130, one or more processors 140 and memory 150. Receiver 120 may comprise receive module 122, receiver digital signal processor ("DSP") and monitoring module 128, and transmitter 130 may include transmit module 132 and transmitter DSP 135. Receiver module 122 is configured to receive optical signals and transmit module 132 is configured to transmit optical signals. According to an embodiment, receiver module 122 and transmit module 132 may be optical pluggable modules. Transmit module 132 of second optical device 110(2) is in communication with receive module 122 of first optical device 110(1) over optical channel 160(1). Similarly, transmit module 132 of first optical device 110(1) is in communication with receive module 122 of second optical device 110(2) over optical channel 160(2).

Receiver DSP 125 is operably coupled to receive module 122 and may estimate one or more parameters associated with receiver 120 and transmitter 130 that may cause impairments to an optical signal received by receive module 122. As discussed more fully below, receiver DSP 125 may use the one or more estimated parameters to compensate for the impairments to the received optical signal caused by receiver 120 and transmitter 130. Monitoring module 128 receives the estimated parameters associated with receiver 120 and transmitter 130 from receiver DSP 125 and may generate an alarm indication if the one or more estimated parameters are above or below preconfigured threshold levels (i.e., outside predetermined tolerance ranges), indicating that receive module 122 and/or transmit module 132 is defective or otherwise not operating properly. The alarm indication may be transmitted to a remote network administrator application 170 (over a network connection). According to an embodiment, receiver DSP 125 may estimate impairments caused by transmit module 132 and relay information related to the estimated impairments to transmitter 130 which may use a return path or service channel over optical channel 160 to signal to receiver 120. Using the information from receive module 120 related to the estimated impairments, transmitter DSP 135 may compensate the optical signal for one or more estimated impairments before forwarding the compensated optical signal to transmit module 132, which may transmit the compensated optical signal to receive module 122. According to an embodiment, the functionality of transmitter DSP 135 may be integrated into the functionality of receiver DSP 125. According to a further embodiment, the functionality of monitoring module 128 may be integrated into the functionality of receiver DSP 125.

The processor 140 may be a microprocessor or a microcontroller. The memory 150 may include read only memory (ROM), random access memory (RAM), magnetic disk storage media devices, optical storage media devices, flash memory devices, electrical, optical, or other physical/tangible memory storage devices. Processor 140 may execute instructions for receive module 122, monitoring module 128 and transmit module 132, which may be stored in the memory 140. For example, processor 140 may execute instructions causing monitoring module 128 to generate an alarm indication if one or more parameters associated with receive module 122 falls outside predetermined tolerance levels associated with the one or more parameters.

Figure 2:
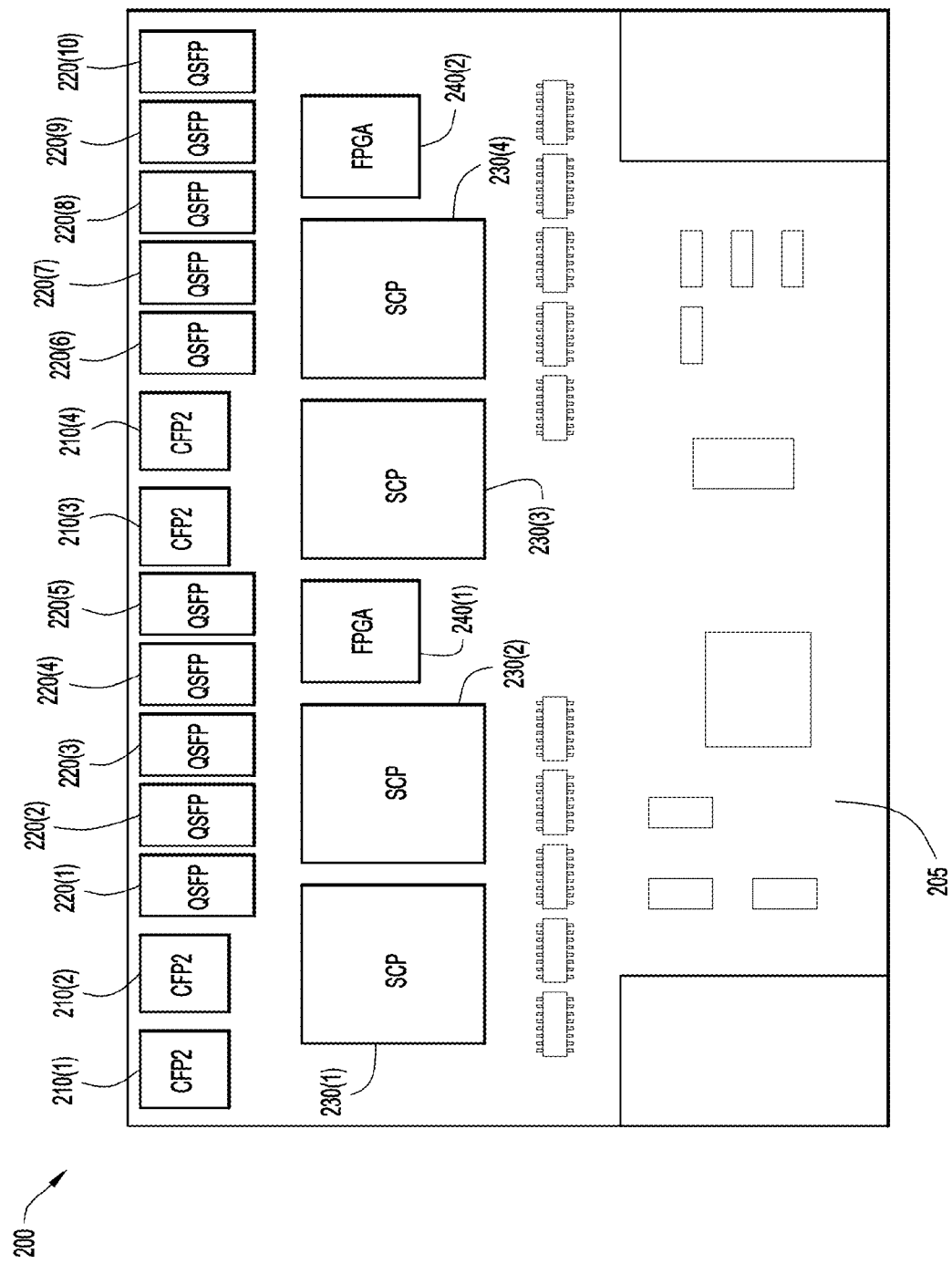
FIG. 2 is a block diagram of an optical communication circuit board employing pluggable optical transceiver modules, according to an example embodiment.

Reference is now made to FIG. 2, which depicts a component layout 200 of an optical device, e.g., one of optical devices 110(1) and 110(2) shown in FIG. 1, according to one example embodiment. Optical communication system 200 may comprise printed circuit board 205, one or more optical transceivers 210(1)-210(N), one or more small form-factor optical transceivers 220(1)-220(N), one or more system control processors (SCPs) 230(1)-230(N), and one or more field programmable gate arrays 240(1)-240(N). According to an embodiment, the one or more optical transceivers 210(1)-210(N) and one or more small form-factor optical transceivers 220(1)-220(N) may perform the functionality of receive module 122 and/or transmit module 132. For example, the optical transceivers 210(1)-210(N) may be C form-factor pluggable (CFP) optical transceivers, e.g., CFP2, and small form-factor optical transceivers 220(1)-220(N) may be Quad Small Form-factor Pluggable (QSFP) optical transceivers. According to a further embodiment, the one or more system control processors 230(1)-230(N) and one or more field programmable gate arrays 240(1)-240(N) may perform the functionality of processor 140 (FIG. 1). For example, system control processor 230($i$) may execute instructions for monitoring module 128 (FIG. 1).

Figure 3:
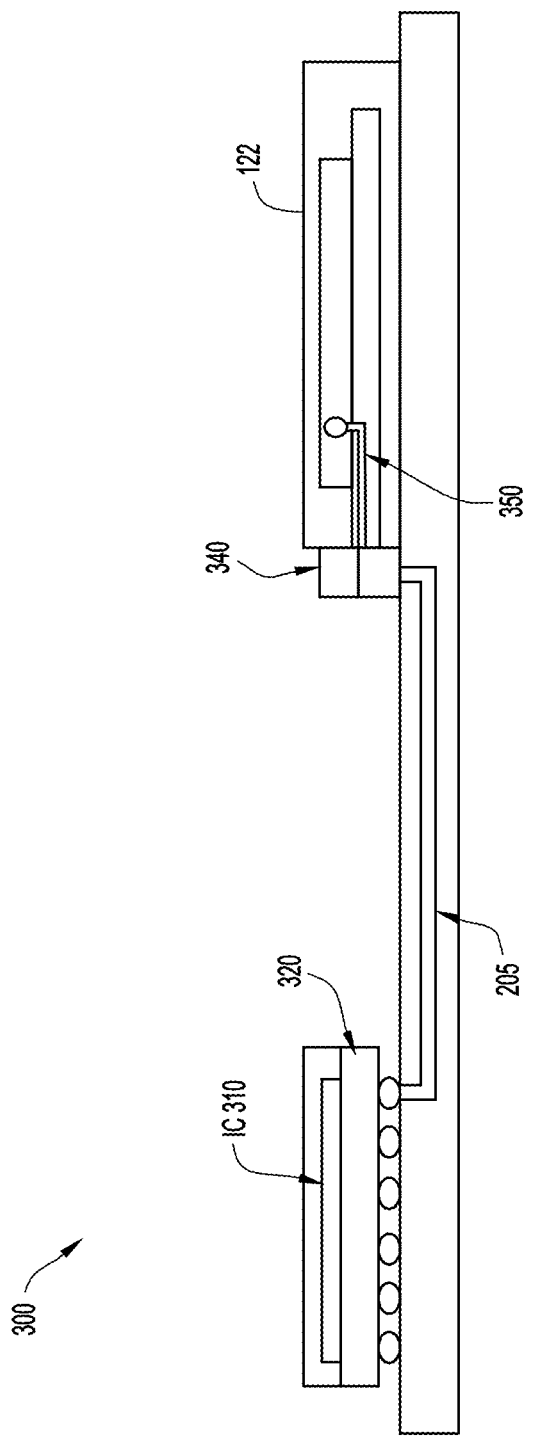
FIG. 3 is a diagram illustrating a cross-sectional view of an optical communication circuit board, according to an example embodiment.

Reference is now made to FIG. 3, which depicts a cross-sectional view 300 of the component layout 200 of FIG. 2, according to an example embodiment. As illustrated in FIG. 3, component layout 200 may further comprise integrated circuit ("IC") 310, interposer internal packaging 320, circuit board 205, connector 340, internal board 350, and receive module 122, each of which has a characteristic frequency response associated with it that may impair the frequency spectrum of received optical signals. Receive module 122 and internal board 350 are attached to circuit board 205 by connector 340. Similarly, IC 310 is connected to circuit board 205 by packaging 320. Receive module 122 may receive an optical signal, convert it to an electrical signal and forward the electrical signal to internal board 350, with which receive module 122 is in communication. Internal board 350 may then forward the electrical signal to circuit board 205 via connector 340. In turn, circuit board 205 may forward the electrical signal to IC 310 for further processing. In particular, IC 310 may execute an algorithm to correct frequency impairments to the received optical signal as a result of the characteristic frequency response associated with each of IC 310, packaging 320, circuit board 205, connector 340, internal board 350, and receive module 122, using the techniques presented herein.

Figure 4:
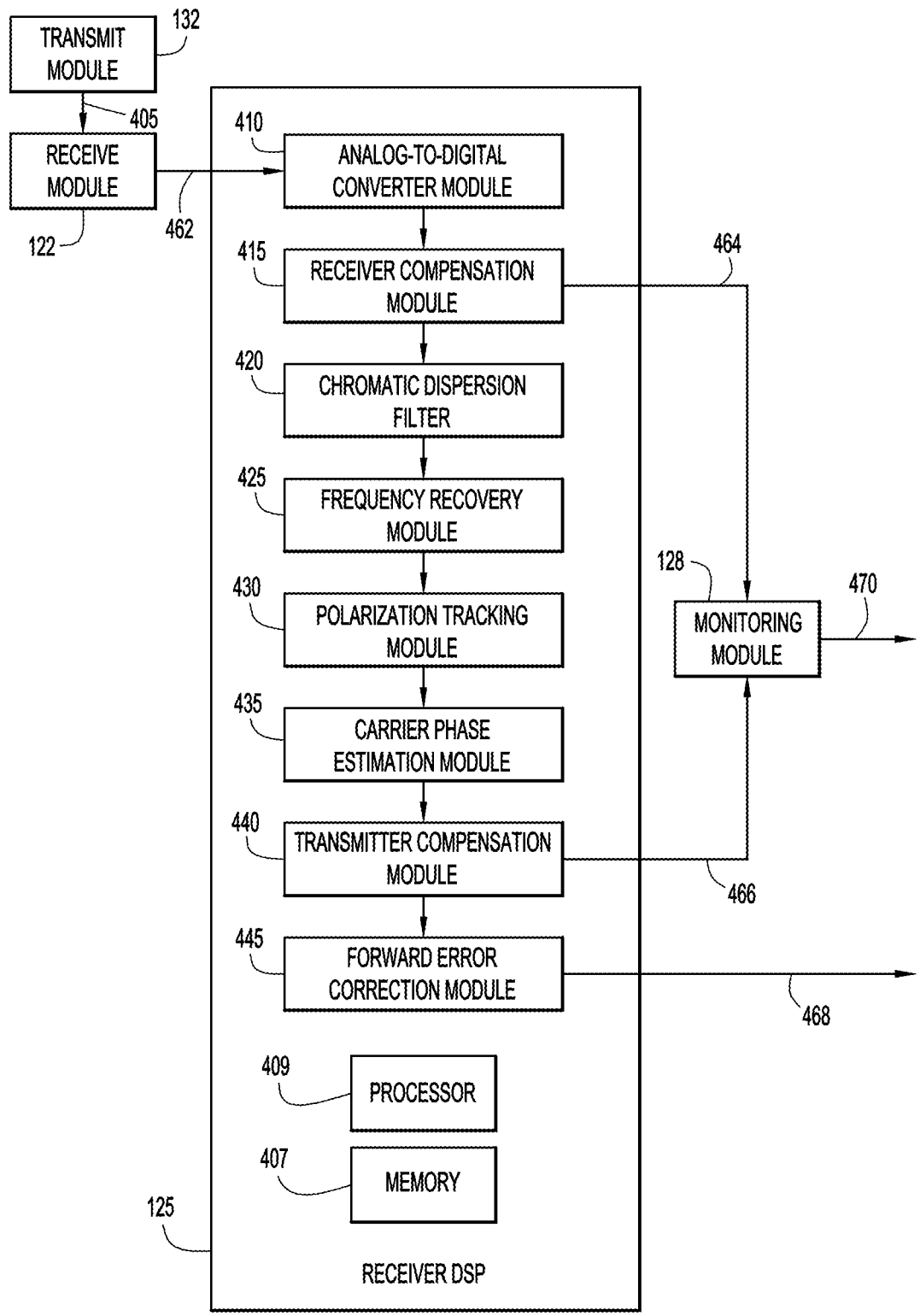
FIG. 4 is a block diagram illustrating an optical receiver signal processor, according to an example embodiment.

Reference is now made to FIG. 4, which depicts a block diagram illustrating the processing of a received optical signal 405 from a transmit module 132 at a far end by receiver DSP 125 at a near, according to an example embodiment. The modules of receiver DSP 125 may be implemented by firmware (fixed or programmable digital logic) or any other suitable DSP implementation now known or hereinafter developed. Alternatively, the modules of receiver DSP 125 may be implemented by software instructions stored in memory 407 that are executed by one or processors 409.

Receiver DSP 125 includes Analog-to-Digital Converter ("ADC") module 410, receiver compensation module 415, chromatic dispersion ("CD") filter 420, frequency recovery module 425, polarization tracking module 430, carrier phase estimation module 435, transmitter compensation module 440 and forward error correction module 445. While monitoring module 128 is shown as being external to receiver DSP 125, this is an illustrative example and it should be understood that the functionality of monitoring module 128 may be performed entirely by monitoring module 128, entirely by receiver DSP 125 or some monitoring operations may be performed at monitoring module 128 and by receiver DSP 125.

In operation, receive module 122 receives optical signal 405 and generates an uncompensated optical receive signal 462. Receive module 122 forwards the uncompensated optical signal 462 to ADC module 410, which converts analog signal 462 to a digital receive signal before forwarding the same to receiver compensation module 415. Receiver compensation module 415 may estimate one or more operational parameters associated with receive module 122 based on the digital receive signal and generates a signal (or signals) 464 representing the one or more operational parameters. In addition, the receive compensation module 415 may compensate for signal impairments related to the one or more estimated operational parameters associated with receive module 122 and the signal output by the receiver compensation module 415 to CD filter 420 may compensate for such signal impairments. Receiver compensation module 415 may send signal 464 representing the one or more estimated parameters associated with receive module 122 to monitoring module 128, before forwarding the compensated digital signal to CD filter 420 for additional processing.

Upon receiving the signal(s) 464 representing the one or more estimated operational parameters associated with receive module 122, monitoring module 128 may compare the one or more estimated operational parameters with one or more predetermined specification tolerance intervals to determine whether any of the one or more estimated receiver parameters lies outside an associated tolerance interval, and, if so, initiate alarm signal 470 indicating that receive module 122 is impaired and/or is not functioning properly.

CD filter 420 processes the output of the receiver compensation module 415 to compensate for impairments related to chromatic dispersion, i.e., receiving different wavelengths of light at different times, and generated a filtered signal. According to an embodiment, CD filter 420 may comprise one or more finite-length impulse response (FIR) digital filters. CD filter 420 may forward the filtered signal to frequency recovery module 425, which may recover the carrier frequency associated with the received optical signal 405 and forward the recovered carrier frequency to polarization tracking module 430. Polarization tracking module may estimate and track the x-polarization and y-polarization components associated with received optical signal 405. According to an embodiment, polarization tracking module 430 includes one or more FIR filters. Polarization tracking module 430 may forward an output (representing the now separated x-polarization and y-polarization components of the transmitted signal) to carrier phase estimation module 435, which may estimate carrier phase information associated with an in-phase component ("I") and a quadrature component ("Q") associated with received optical signal 405.

Based on the output of the carrier phase estimated module 435, the transmitter compensation module 440 may estimate the impairments related to one or more operational parameters associated with transmit module 132. That is, the transmitter compensation module 440 may use the results of the operations of CD filter 420, frequency recovery module 425, polarization tracking module 430, and carrier phase estimation module 435 to estimate, and compensate for, the impairments to the received optical signal 405 caused by imperfections in transmit module 132 at the far end. Transmitter compensation module 440 may estimate one or more operational parameters associated with transmit module 132. Transmitter compensation module 440 may further store data representing the I/Q constellations associated with received optical signal 405 and send signal(s) 466 representing the one or more estimated parameters associated with transmit module 132 to monitoring module 128. Monitoring module 128 may compare the one or more estimated operational parameters with one or more predetermined specification tolerance intervals to determine whether any of the one or more estimated transmitter parameters lies outside a predetermined specification interval. If so, monitoring module 128 will initiate alarm signal 470 indicating that transmit module 132 is impaired and/or is not functioning. After compensating the signal impairments related to transmit module 132, transmitter compensation module 440 may forward a transmitter compensated digital signal to forward error correction ("FEC") module 445 to correct coding errors in the digital signal. The FEC module 445 generates as an output a FEC-corrected digital signal 468.

Figure 5:
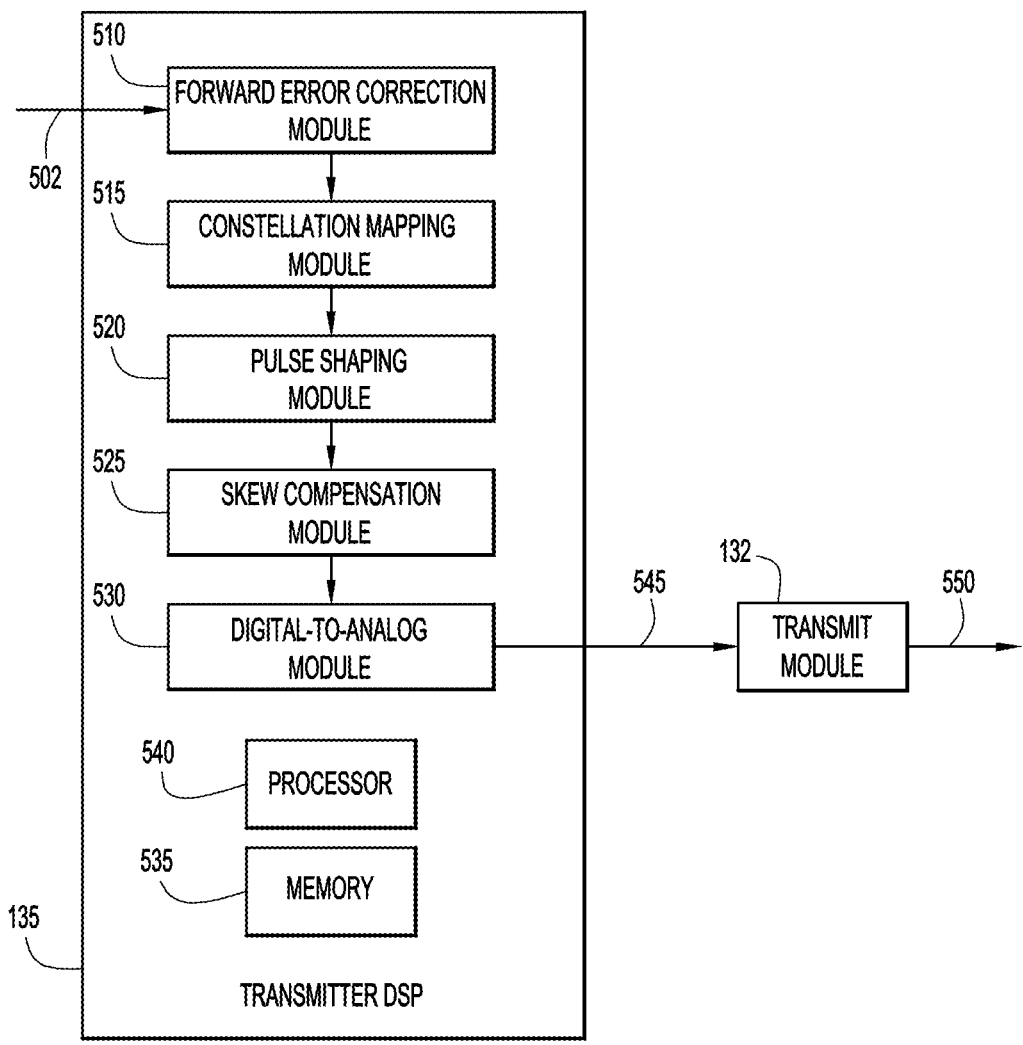
FIG. 5 is a block diagram illustrating an optical transmitter signal processor, according to an example embodiment.

Reference is now made to FIG. 5, which depicts a block diagram illustrating the flow of digital transmit signal 502 through optical transmitter DSP 135, according to an example embodiment. Transmitter DSP 135 includes an FEC encoder module 510, constellation mapping module 515, pulse shaping module 520, skew compensation module 525 and Digital-to-Analog Converter ("DAC") module 530. Transmitter DSP 135 further includes one or more processors 535 and a memory 540. The modules of transmitter DSP 135 may be implemented by firmware (fixed or programmable digital logic) or any other suitable DSP implementation now known or hereinafter developed. Alternatively, the modules of transmitter DSP 135 may be implemented by software instructions stored in memory 535 that are executed by one or processors 540.

In operation, transmitter DSP 135 receives digital transmit signal 502 to be transmitted and processes signal 502 before forwarding it to transmit module 132 that generates optical transmit signal 550. Accordingly, FEC module 510 receives digital transmit signal 502 and FEC-encodes it to allow receiver DSP 125 to correct for transmission errors. FEC module 510 forwards the FEC-encoded signal to constellation mapping module 515. Constellation mapping module 515 may determine in-phase (I) and quadrature (Q) symbol data for one or more information bits. Constellation mapping module 515 may forward the one or more I and Q symbol data to pulse shaping module 520. Pulse shaping module 520 may comprise one or more filters to optimally shape input I and Q symbol data streams to minimize intersymbol interference ("ISI") between the individual symbols of the I and Q data streams when detected at the receiver. According to an embodiment, the one or more filters may be a root raised-cosine filter. Pulse shaping module 520 may forward the filtered I and Q data streams to skew compensation module 525, which compensates for the timing skew between I and Q data streams. This skew may be initially determined during calibration, or be optimized by estimates from the remote receiver, provided via a return service channel. According to an embodiment, the functionality of pulse shaping module 520 and skew compensation module 525 may be performed entirely at the one or more filters comprising pulse shaping module 520. After compensating for the estimated skew between the filtered I and Q symbol data streams, skew compensation module 525 forwards the I and Q symbol data streams to DAC module 530, which converts each of the one or more I and Q symbols to analog values corresponding to the phase and amplitude of the one or more I and Q symbols. DAC module may send signal 545 that includes the analog values corresponding to the phase and amplitude of the one or more I and Q symbols to transmit module 132, which converts these analog values to optical signal 550 that is transmitted to the far end optical device.

Figure 6A:
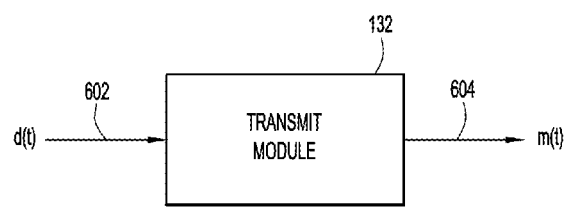
FIGS. 6A and 6B are block diagrams illustrating an ideal transmitter adding no signal impairments and an imperfect transmitter impairing a transmitted optical signal, according to an example embodiment.
Figure 6B:
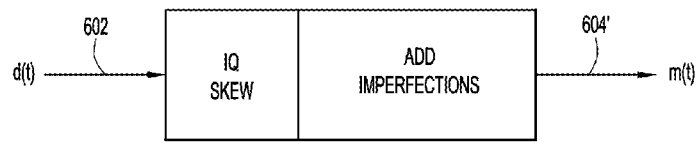

Reference is now made to FIG. 6A, which shows a block diagram illustrating an ideal transmit module 132, according to an example embodiment. As shown in FIG. 6A, ideal transmit module 132 receives input signal d(t) 602, processes it according to the operations described above without impairing input signal 602, and optically transmits the unimpaired signal m(t) 604. With reference to FIG. 6B, a block diagram is shown illustrating an idealized transmit module 132 having imperfections, according to an example embodiment. As shown in FIG. 6B, transmit module 132 receives input signal d(t) 602, and, during processing of the input signal 602, adds a timing skew between the I and Q symbol data streams and impairs the input signal due to imperfections in transmit module 132. According to an embodiment, the impairments to signal 602 may result from uncalibrated mismatches in the path delays XI vs XQ, YI vs YQ (in the case of skew), or imperfect control or modulator bias voltages (IQ quadrature error/IQ offset), or calibration of the modulator driver gain (IQ gain imbalance). After skewing the IQ streams and impairing signal 602, transmit module 132 optically transmits the impaired signal m(t) 604'. The IQ skew and imperfections that may be added by the optical transmit module 132 are estimated and, if possible, compensated for according to the techniques presented herein.

Figure 7C:
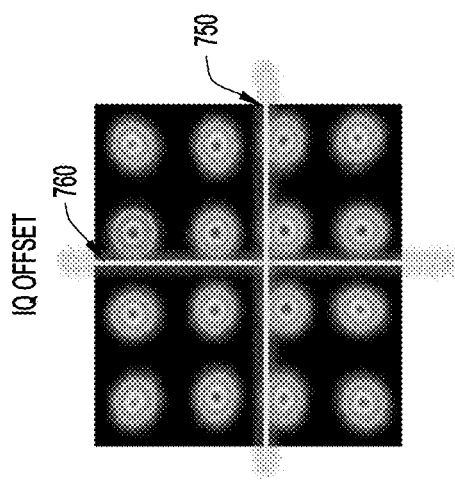
FIGS. 7A-7C illustrate constellations depicting IQ quadrature errors, IQ gain errors and IQ offset errors, according to an example embodiment.
Figure 7B:
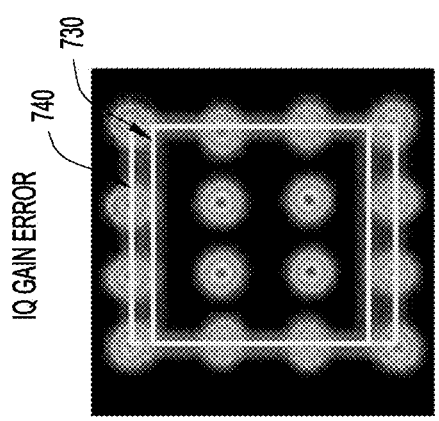
Figure 7A:
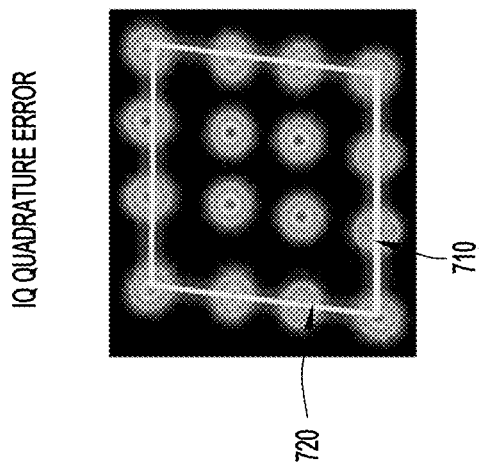

With reference to FIGS. 7A-7C, constellation are shown illustrating IQ quadrature errors, IQ gain errors and IQ offset errors, according to an embodiment. Reference may also be made to FIGS. 1, 4 and 7 in connection with the description of FIGS. 7A-7C. Referring first to FIG. 7A, a 16-point QAM constellation is shown of an IQ quadrature error. As shown in FIG. 7A, the quadrature projections are not orthogonal to the in-phase projections, causing the constellation to appear as a skewed parallelogram rather than as a square. IQ quadrature error indicates the amount of the angle skew between the in-phase data stream and the quadrature data stream. Ideally, the in-phase data stream and the quadrature data stream should have a phase difference of 90 degrees, i.e., in-phase axis 710 is orthogonal to quadrature axis 720. According to an embodiment, receiver DSP 125 may compensate the received optical signal for quadrature error by leaking the data on the quadrature data stream through to the in-phase data stream, while simultaneously leaking the in-phase data stream through to the quadrature data stream.

Referring to FIG. 7B, a 16-point QAM constellation having an IQ gain imbalance is illustrated. IQ gain imbalance indicates the amount of amplifier gain imbalance between the in-phase and quadrature signals. As shown in FIG. 7B, the gain on the quadrature path is less than that on the in-phase path, causing an IQ gain mismatch and leading to a constellation that is not square in shape. For a symbol within the constellation for which the gain for the in-phase component should equal that for the quadrature component, the IQ gain imbalance may be determined as: $20 \log_{10} (I/Q)$ [Equation 9]. According to an embodiment, receiver DSP 125 may compensate the received optical signal for IQ gain imbalance by adjusting the hqq and hii filter tap weights, while simultaneously setting to zero the cross-over filter tap weights hqi and hiq, thereby scaling either the in-phase component or the quadrature component more than the other. For example, given the quadrature gain error shown in FIG. 7B, receiver DSP 125 may decrease the gain on the quadrature path, thereby reducing the quadrature component of the received constellation from that shown at 740 to that shown at 730, facilitating the correct decoding of the QAM symbols at receiver DSP 125.

Referring to FIG. 7C, a 16-point QAM constellation is shown having an IQ offset error. IQ offset error indicates the magnitude of the IQ signal when there is no carrier on the received optical signal. Ideally the IQ offset should be equal to zero when no carrier signal is present. As shown in FIG. 7C, however, an IQ offset error skews the constellation, leading to a constellation in which the in-phase axis 750 and quadrature axis 760 are offset, i.e., the origin is not centered properly.

Figure 8:
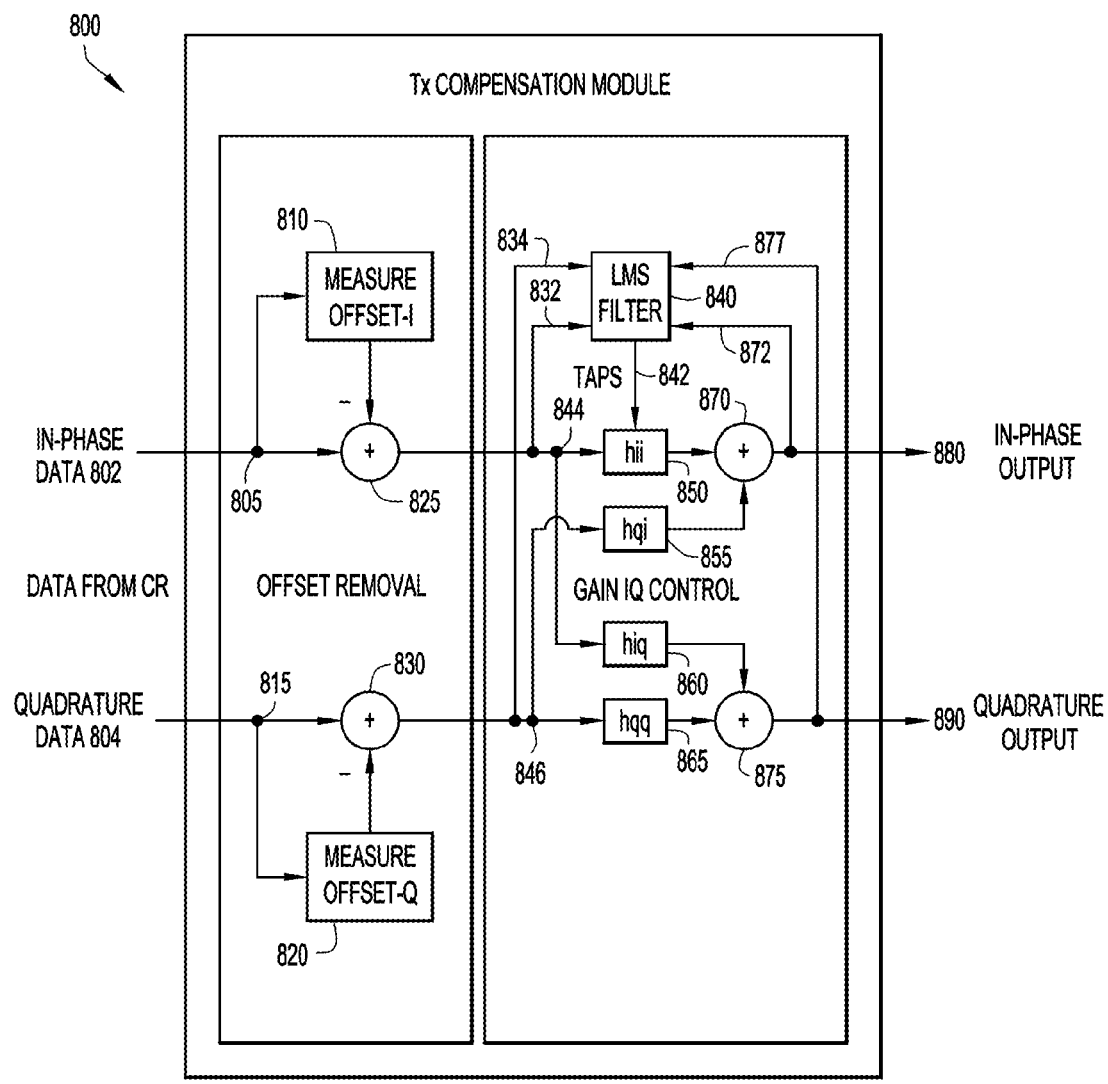
FIG. 8 is a high-level block diagram depicting operations performed to compensate for in-phase and quadrature (IQ) offset errors and IQ gain imbalance, according to an example embodiment.

Reference is now made to FIG. 8, which is a block diagram depicting operations 800 performed by transmitter compensation module 440 shown in FIG. 4) to compensate for IQ offset errors, IQ quadrature error, IQ timing skew and IQ gain imbalance of an optical transmitter module on the far end, according to an example embodiment. Reference may also be made to FIGS. 1, 4 and 5 in connection with the description of FIG. 8. As shown in FIG. 8, operations 802-830 may be performed to compensate optical signal for IQ offset errors, and operations 832-877 may be performed to compensate signal for IQ gain imbalance, IQ quadrature error and IQ timing skew. At 802, transmit compensation module 440 receives an in-phase (I) data stream and, at 804, receives a quadrature (Q) data stream. At 805, the in-phase data stream is split and is fed into in-phase offset measuring operation 810 that measures the offset of the in-phase data stream. At 815, the quadrature stream data stream is split, and is fed into quadrature offset measuring operation 820 that measures the offset of the quadrature data stream. At 825, the measured offset of the in-phase data stream is subtracted from the in-phase input data stream received to remove the offset bias. At 830, the measured offset of the quadrature data stream is subtracted from the quadrature input data stream to remove the offset bias.

At 832, the offset-corrected in-phase data stream generated at 825 is fed into a least means square ("LMS") module 840 and, at 834, the offset-corrected quadrature data stream generated at 830 is also fed into the LMS module 840. LMS 840 module may estimate errors in the in-phase and quadrature data streams due to IQ gain imbalance and may use these estimates to generate tap weights hii, hqi, hiq and hqq for filters 850, 855, 860 and 865 to cancel the IQ gain imbalances. At 842, LMS module 840 forwards tap weights hii, hqi, hiq and hqq to filters 850, 855, 860 and 865, respectively. According to an embodiment, LMS module 840 may automatically control the tap weights hii, hqi, hiq and hqq for filters 850, 855, 860 and 865 to minimize impairments due to IQ gain imbalance, IQ quadrature error and IQ timing skew. According to a further embodiment, the in-phase and quadrature data streams may initially comprise pilot symbols having predetermined values to facilitate error estimation and correction. The filters 850, 855, 860 and 865 may be single-tap finite impulse response (FIR) filters, in one embodiment. In order to compensate for IQ timing skew, more than a single-tap FIR filter is required.

At 844, the in-phase data stream generated at 825 is fed into both filter 850 having tap weight hii and filter 860 having tap weight hiq. Filters 850 and 860 multiply the input in-phase data stream by tap weights hii and hiq, respectively. Similarly, at step 846, the quadrature data stream generated at step 830 is fed into both filter 855 having tap weight hqi and filter 865 having tap weight hqq. Filters 855 and 865 multiply the quadrature data stream by tap weights hqi and hqq, respectively. At 880, the in-phase data stream adaptively scaled by filter 850 and the quadrature data stream adaptively scaled by filter 855 are summed together to generate as output a gain imbalance-corrected in-phase data stream, which, at 882, is fed back into LMS module 840 to allow LMS module 840 to update the estimates for the IQ gain imbalance and IQ offset errors. At 875, the in-phase data stream adaptively scaled by filter 860 and the quadrature data stream adaptively scaled by filter 865 are summed together to generate as output a gain imbalance-corrected quadrature data stream, which, at 877, is fed back into LMS module 840 to allow LMS module 840 to update the estimates for IQ gain imbalance and IQ offset errors. At 880 and 890, the corrected in-phase and quadrature data streams are output. According to an embodiment, LMS module 840 continuously updates the values for tap weights hii, hqi, hiq and hqq based on updated error estimates. According to a further embodiment, the values for tap weights hii, hqi, hiq and hqq may be used to estimate the operational parameters of receive module 122 and transmit module 132.

As shown in FIG. 8, IQ offset may be determined by averaging the measured IQ offset for each symbol in the constellation to estimate where each point of the constellation is located. For example, the received optical signal may include known pilot symbols and receiver DSP 125 may average the IQ offset for each received pilot symbol to determine the average location of each symbol in the constellation. According to an embodiment, the IQ offset error of a constellation may be measured by comparing the received constellation, as determined by averaging the location of the received pilot symbols, assuming the received pilot symbols are equally distributed. According to a further embodiment, the offset removals 825 and 830 may compensate the received optical signal for IQ offset errors by dynamically updating the values in the offset estimator blocks 810 and 820.

Figure 9A:
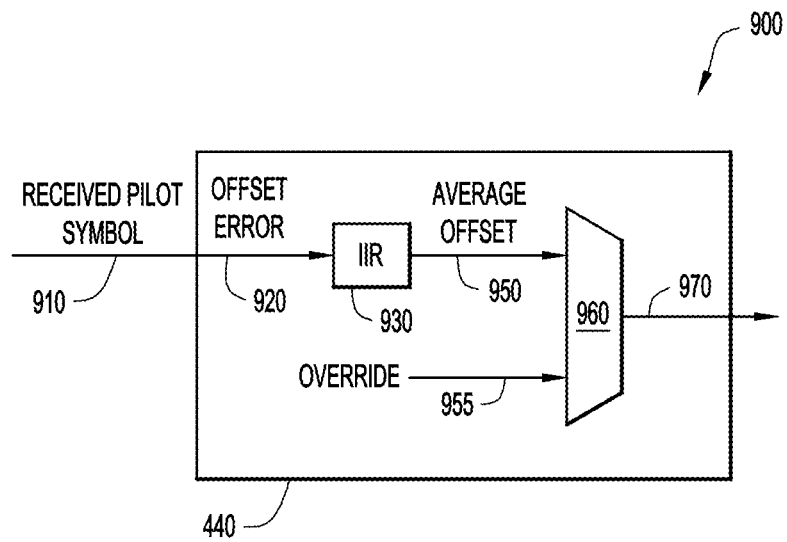
FIGS. 9A and 9B are block diagrams depicting operations to determine average IQ offset errors, according to an example embodiment.

Reference is now made to FIG. 9A, which is a block diagram depicting operations 900 performed to determine transmitter IQ offset errors for updating the same. Reference may also be made to FIGS. 1, 4, 5 and 7 in connection with the description of FIG. 9A. At 910, transmitter compensation module 440 receives an input IQ data stream having an offset error $E_i(k)$. According to an embodiment, the input IQ data stream initially may comprise predetermined pilot symbols representing known positions in a constellation. Offset error $E_i(k)$ may be determined as the difference between the actual positions of the points in the constellation corresponding to the input IQ data stream received at step 910 and the known or expected positions of the points in the constellation for the received data stream. If the constellation positions corresponding to pilot symbols are equally distributed, e.g., QPSK constellations, the offset error $E_i(k)$ may be determined by averaging positions corresponding to received pilot symbols. At 920, the input IQ data stream is fed into an IIR filter 930 that determines the average offset error for the input data stream. At 950, the average offset error is fed into buffer 960, where it is combined with an override signal 955 before being output at 970. According to an embodiment, override signal 955 may be used to override the average IQ offset measurement for purposes of debugging. In normal operation, the override signal would not be used.

Figure 9B:
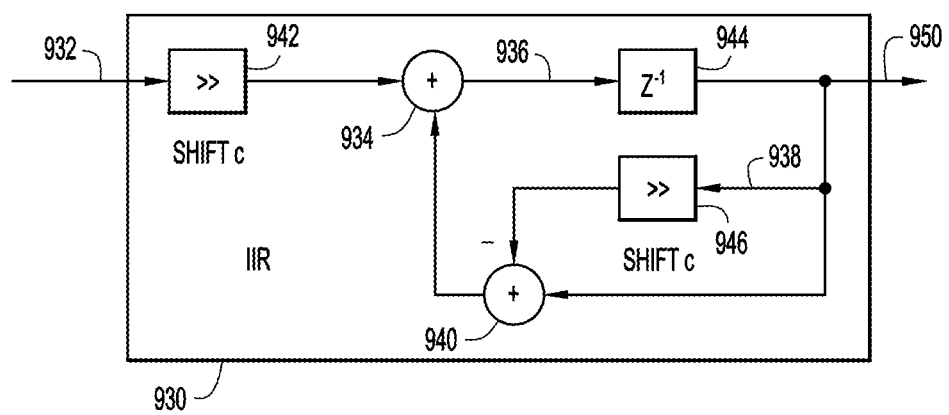

With reference to FIG. 9B, a block diagram is shown depicting operations performed in IIR filter 930 to determine the average IQ offset error, according to an embodiment. This filter is an efficient implementation of an IIR filter using only shift registers, where the output $y_{k+1}$ depends upon the input $x_k$ according to $y_{k+1}=(1-\mu)\cdot y_k+\mu\cdot x_k$ where the update coefficient $\mu$ is a number of the form $2^{-N}$ where N is an integer. As shown in FIG. 9B, at 932, shift register 942 shifts the input data stream by c binary positions. At 934, the output of shift register 942 is summed together with a feedback signal, as generated below. At 936, the output of operation 934 is fed into delay circuit $(Z^{-1})$ 944, that, at 939, feeds the output signal back to shift register 946 that shifts the signal by c positions. At 940, the output of shift register 946 is summed together with the output of delay circuit 944 to determine a feedback signal, which at 934, is summed together with the output of shift register 942. At 950, the output is taken at the delay circuit 944 is outputted. In the operations depicted in FIGS. 9A and 9B, 50 kHz tracking may be used to remote dither from the transmitter control loops.

Figure 10:
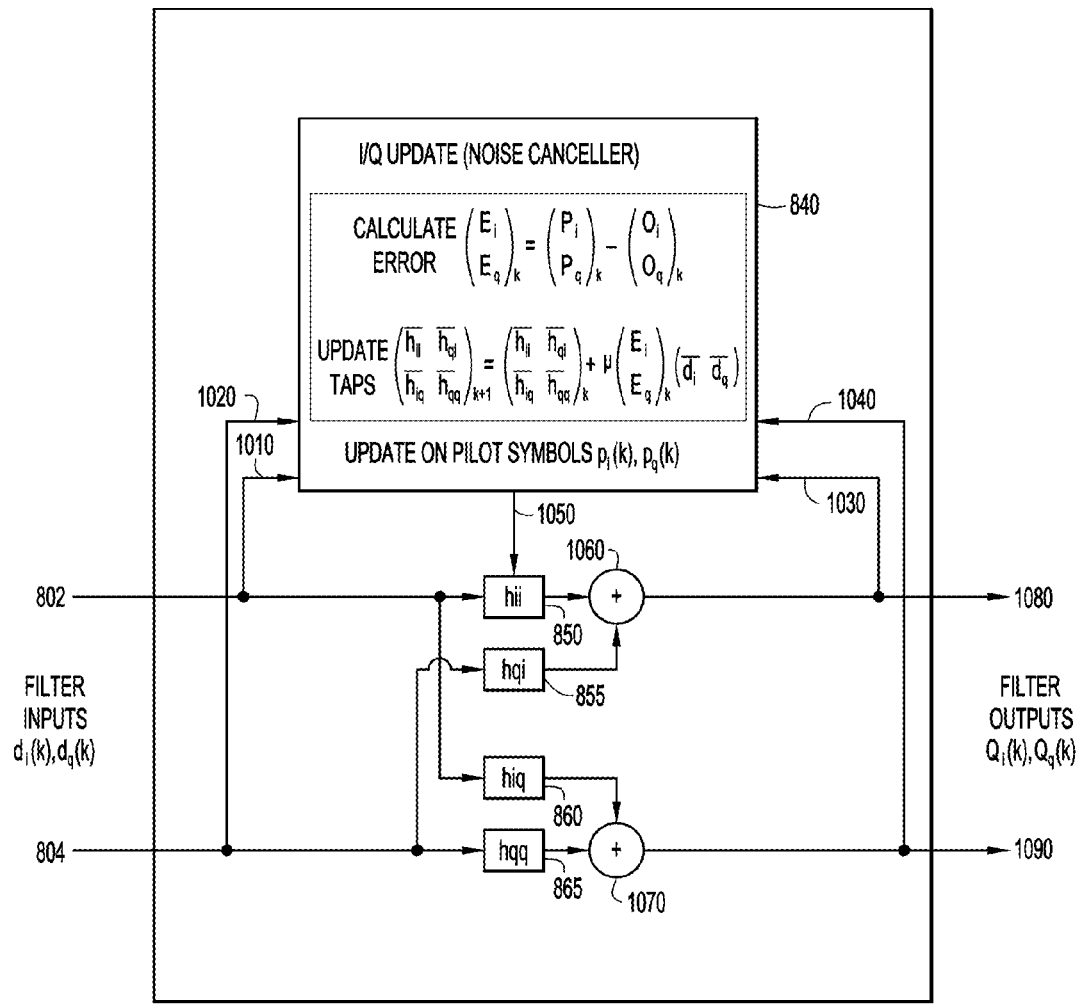
FIG. 10 is a block diagram depicting operations performed to update IQ gain imbalance, according to an example embodiment.

Reference is now made to FIG. 10, which is a diagram depicting operations performed to determine updates of transmitter IQ gain imbalance, according to an example embodiment. Reference may also be made to FIGS. 1, 4, 5 and 8 in connection with the description of FIG. 10. At 1010, in-phase input data stream $d_i(k)$ 802 is fed to LMS module 840 and, at 1020, quadrature input data stream $d_q(k)$ 804 is fed to LMS module 840. The LMS module 840 operates as an I/Q update (noise canceller). At 1030, in-phase output data stream $O_i(k)$ 880 is fed back into LMS module 840 and, at 1040, quadrature output data stream $O_q(k)$ 890 is also fed back into LMS module 840. At 1050, LMS module 840 determines an error of the in-phase data stream $d_i(k)$ 802 as the difference between the in-phase value at time k of a known pilot signal, $p_i(k)$, and the in-phase output data stream $O_i(k)$ 860. That is, $E_i(k)=p_i(k)-O_i(k)$ [Equation 1]. Similarly, LMS module 840 determines the error of the quadrature input data stream $d_q(k)$ 804 as the difference between the quadrature value at time k of a known pilot signal, $p_q(k)$, and the quadrature output data stream $O_q(k)$ 890. That is, $E_q(k)=p_q(k)-O_q(k)$ [Equation 2].

At 1050, the LMS module 840 may update the tap weights for FIR filters 850 and 855 based on the determined errors of the in-phase output data stream $O_i(k)$ 880, and FIR filters 860 and 865 based on the determined errors of the quadrature output stream Oq(k) 890. Accordingly, LMS module 840 may increase the previous tap weights by an amount equal to the error multiplied by a small value, $\mu$. Over time, the error values may be reduced, and the tap weight values may converge to a value that minimizes the LMS of the errors. Thus, in period k+1, LMS module 840 may determine the new tap weight vectors for $\bar{h}_{ii}$, $\bar{h}_{qi}$, $\bar{h}_{iq}$, $\bar{h}_{qq}$ as:

$$\begin{pmatrix} \bar{h}_{ii} & \bar{h}_{qi} \\ \bar{h}_{iq} & \bar{h}_{qq} \end{pmatrix}_{k+1} = \begin{pmatrix} \bar{h}_{ii} & \bar{h}_{qi} \\ \bar{h}_{iq} & \bar{h}_{qq} \end{pmatrix}_k + \mu \begin{pmatrix} E_i \\ E_q \end{pmatrix}_k (\bar{d}_i \; \bar{d}_q)_k \quad \text{[Equation 3]}$$

where $\bar{d}_i$ and $\bar{d}_q$ are the input data vectors;
$\mu$ is the update coefficient; and
Ei and Eq are the error between known pilot symbol positions (p) and the output of the filter (O).

According to an embodiment, the FIR vector coefficients shown in the vector operations of Equation 3 may consist of more than a single tap. At 1060, in-phase output data stream $O_{i(k)}$ 880 is generated as the sum of the in-phase input data stream vector $\bar{d}_i$ 802 multiplied by the updated tap weight vector for $\bar{h}_{ii}$ and the quadrature input data stream vector $\bar{d}_q$ 804 multiplied by the updated tap weight vector for $\bar{h}_{qi}$. Similarly, at 1070, quadrature output data stream $O_{q(k)}$ 890 is generated as the sum of the quadrature input data stream $\bar{d}_q$ 804 multiplied by the updated tap weight vector for $\bar{h}_{qq}$ and the in-phase input data stream $\bar{d}_i$ 802 multiplied by the updated tap weight for $\bar{h}_{iq}$. That is, in-phase output data stream $O_{i(k)}$ 880 and quadrature output data stream $O_{q(k)}$ 890 may be generated as:

$$\begin{pmatrix} O_i \\ O_q \end{pmatrix}_{k+1} = \begin{pmatrix} \bar{h}_{ii} & \bar{h}_{qi} \\ \bar{h}_{iq} & \bar{h}_{qq} \end{pmatrix}_k \begin{pmatrix} \bar{d}_i \\ \bar{d}_q \end{pmatrix}_k \qquad \text{[Equation 4]}$$

At 1080, the updated in-phase output data stream Oi(k) 880 is output for further processing and, at 1090, the updated quadrature output data stream Oq(k) 890 is also output for further processing.

Figure 11:
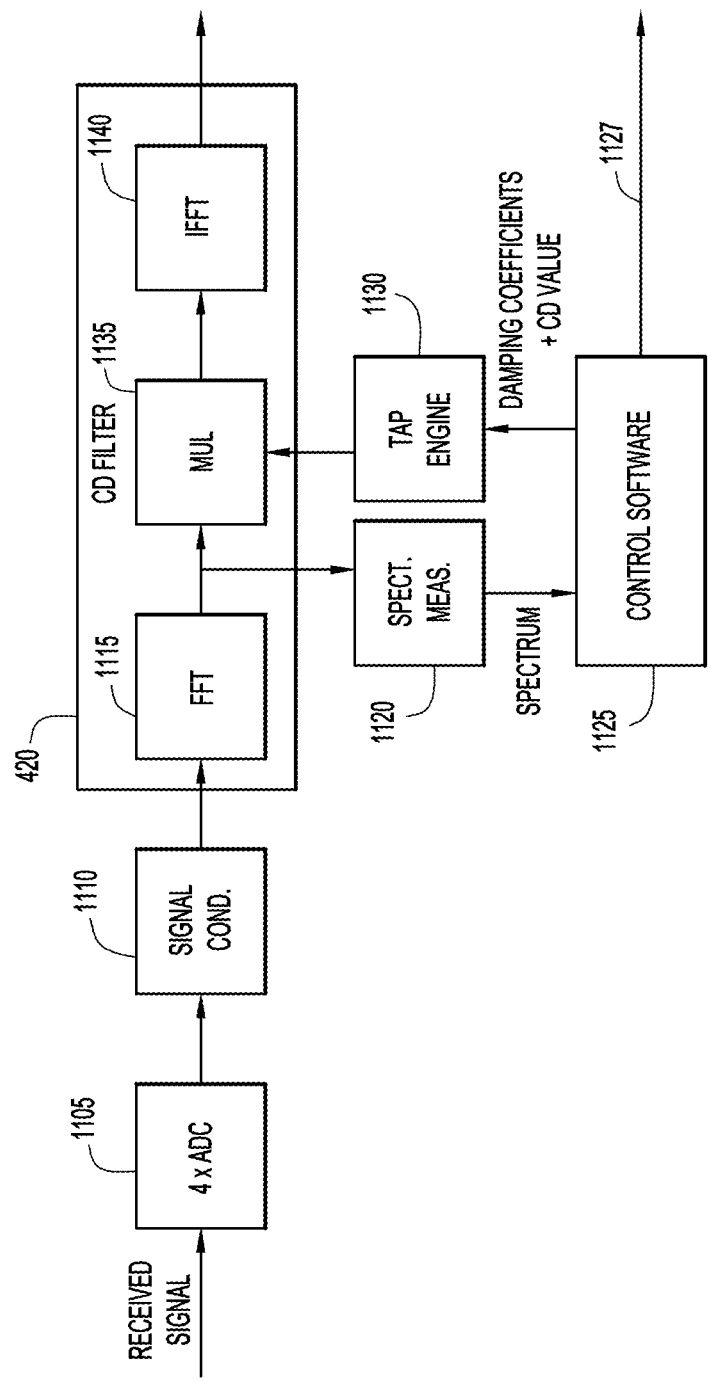
FIG. 11 illustrates signal processing associated with chromatic dispersion filter compensation, according to an example embodiment.

Reference is now made to FIG. 11, in which a signal processing diagram is shown for chromatic dispersion filter compensation performed by CD filter module 420, according to an embodiment. Reference is also made to FIG. 4 for purposes of the description of FIG. 11.

As well as compensating for chromatic dispersion (CD) in the transmission fiber, the CD filter may be used to compensate for the frequency response of the receiver module, electrical interface and ADC 1105. The partial compensation performed by the CD filter module 420 achieves better resolution by making a direct measurement of the input spectrum (associated with the received optical signal). This reduces the number of taps needed in a polarization filter 430 and simplifies acquisition. This receive side frequency response compensation made by the CD filter module 420 also compensates for residual transmitter frequency response imperfections.

In operation, one or more (e.g., four) ADCs 1105 of ADC module 410 (shown in FIG. 4) sample a signal output by the optical receive module 122 and feed the sampled signal into signal conditioner 1110 that conditions the sampled signal in terms of gain for both the in-phase and quadrature channels, as well as for IQ skew compensation, before forwarding the conditioned signal to Fast Fourier Transform ("FFT") module 1115 in CD filter module 420. FFT module 1115 performs an FFT operation on the conditioned signal to generate an associated frequency spectrum and feeds the signal into a spectrum measuring module 1120 that makes spectral measurements on the generated frequency spectrum as well as into multiplier 1135 where it is multiplied by frequency damping coefficients, i.e., tap weights. Spectrum measuring module 1120 receives the generated frequency spectrum and measures the average frequency spectrum for both the x-polarization and y-polarization of the received optical signal. According to an embodiment, the generated frequency spectrum and average frequency spectrums may be stored in memory 407 (shown in FIG. 4).

Control software 1125 (e.g., stored in memory 407 and executed by processor 407) calculates the compensation damping coefficients for both the in-phase and quadrature signals, as well as the CD dispersion values for the average frequency spectrums determined by spectrum measuring module 1120. According to an embodiment, control software 1125 compares the generated frequency spectrum with a target spectral shape (for example linear or root-raised cosine) determine the appropriate compensation damping coefficients. Control software 1125 may output the generated frequency spectrum 1127 to monitoring module 128 (FIG. 4) for further processing to determine whether an alarm indication should be generated. Control software 1125 may also output the damping coefficients to tap engine 1130. Control software 1125 forwards the damping coefficients to tap engine 1130. Tap engine 1130 computes a total frequency domain response by multiplying the damping coefficients generated by the control software 1125 by the frequency domain CD compensation response derived from the current CD value. The multiplier 1135 operation multiplies the frequency response damping coefficients with the conditioned signal generated by signal conditioner 1110 before forwarding the combined signal to Inverse Fast Fourier Transform ("IFFT") module 1140. IFFT module 1140 may perform an IFFT operation on the combined signal to produce a compensated output signal.

Figure 12:
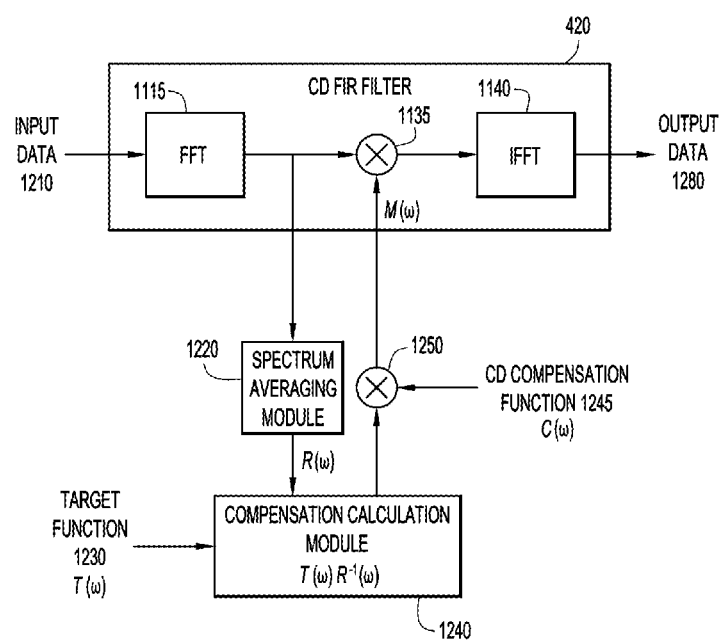
FIG. 12 illustrates an operation to measure the frequency spectrum associated with an input signal using a target function, according to an example embodiment.

Reference is now made to FIG. 12, in which a signal processing diagram is shown for chromatic dispersion filter compensation using a target function performed by CD filter module 420, according to an embodiment. Reference is also made to FIGS. 4 and 11 for purposes of the description of FIG. 12.

In operation, a conditioned input signal 1210 is forwarded into FFT module 1115 in CD filter module 420. According to an embodiment, CD filter module 420 performs filtering based upon the well known Overlap-Save frequency domain FIR filter approach. FFT module 1115 performs an FFT operation on conditioned signal 1210 to generate an associated frequency spectrum and feeds the signal into spectrum averaging module 1220 as well as into multiplier 1135 where it is multiplied by a compensation multiplier, M(ω). Spectrum averaging module 1220 receives the associated frequency spectrum generated by FFT module 1115 and determines the average frequency spectrum R(ω) for both the x-polarization and y-polarization of the received optical signal. According to an embodiment, spectrum averaging module 1220 may repeatedly average the x-polarization and y-polarization frequency spectrums to determine the average frequency spectrum for input signal 1210. Spectrum averaging module 1220 forwards the determined the average frequency spectrum R(ω) to compensation module 1240.

Compensation module 1240 (e.g., stored in memory 407 and executed by processor 407) receives the determined average frequency spectrum R(ω) from spectrum averaging module 1220 as well as a target function T(ω) 1230 and calculates a target spectrum based on the received average spectrum and target function. According to an embodiment, compensation module 1240 determines the target frequency spectrum by multiplying the received target function T(ω) 1230 by the inverse of the average spectrum, $R^{-1}(\omega)$ to determine. the target frequency spectrum as:

Target Spectrum=$T(\omega)R^{-1}(\omega)$ [Equation 5].

Compensation module 1240 may output the generated target frequency spectrum to multiplier 1250, which multiplies the target frequency spectrum by a CD compensation function C(ω) to determine the compensation multiplier function, M(ω) as:

$M(\omega)=C(\omega)[T(\omega)R^{-1}(\omega)]$ [Equation 6].

Multiplier 1250 forwards the determined compensation multiplier function M(ω) to multiplier 1135, which multiplies conditioned input signal 1210 by the compensation multiplier function M(ω) and forwards the compensated signal to IFFT module 1140. IFFT module 1140 may perform an IFFT operation on the compensated signal to produce compensated output signal 1280.

Figures 13A, 13B:
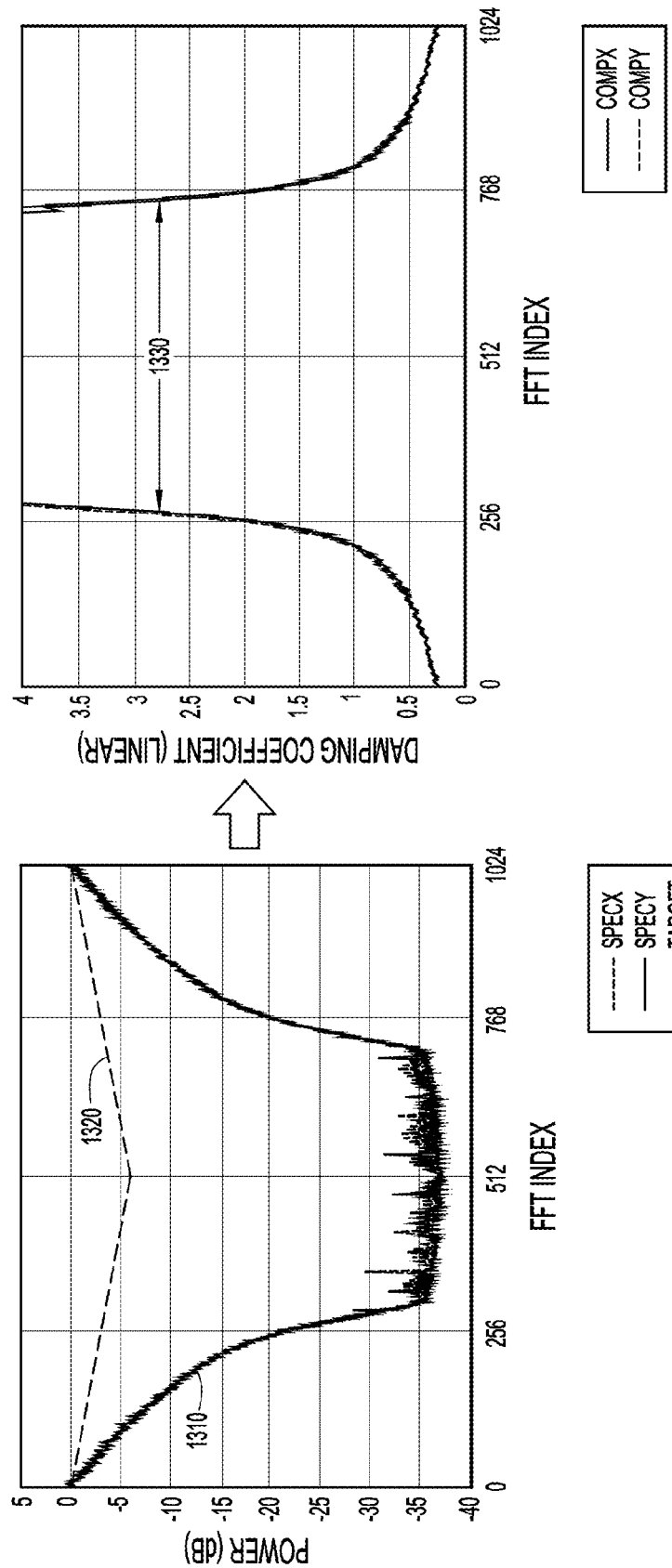
FIGS. 13A and 13B illustrate the results of operations to determine frequency damping coefficients used in the chromatic dispersion filter compensation, according to an example embodiment.

Reference is now made to FIGS. 13A and 13B, which illustrate the results of operations to determine frequency damping coefficients described above in connection with FIGS. 11 and 12 according to an embodiment. As described above, a target function may be used to calculate a compensation function. With reference to FIG. 13A, a comparison is made of the frequency spectrum 1310 of a received signal, as determined by the spectral measurement 1120, with a linear target function 1320 over the same FFT index range. The frequency spectrum 1310 has a positive frequency response over the FFT index range: 0≤FFT index≤512, i.e., when the FFT index is less than or equal to the baud rate of the received signal, and a negative frequency response, which is a mirror image of the positive frequency response, over the FFT index range: 512<FFT index≤1024. Frequency spectrum 1310 therefore is characterized by a non-linear roll-off over the range of the positive frequency response.

In contrast, target function 1320 is a linear function characterized by a relatively flat frequency response. According to an embodiment, target function 1320 may be a linear filter having a 3 dB attenuation at half baud rate of input signal and a 5 dB attenuation at the full baud rate of input signal. According to a further embodiment, target function 1320 is associated with a root-raised cosine filter. Target function 1320 may be used to determine compensation function 1330. With reference to FIG. 13B, a compensation function 1330 may be determined as the difference between the target function 1320 and the frequency spectrum 1310 in decibels. As such, compensation function 1330 may be characterized by a non-linear, monotonically increasing gain function. According to a further embodiment, compensation function 1330 may be normalized for a given power level.

Figure 14:
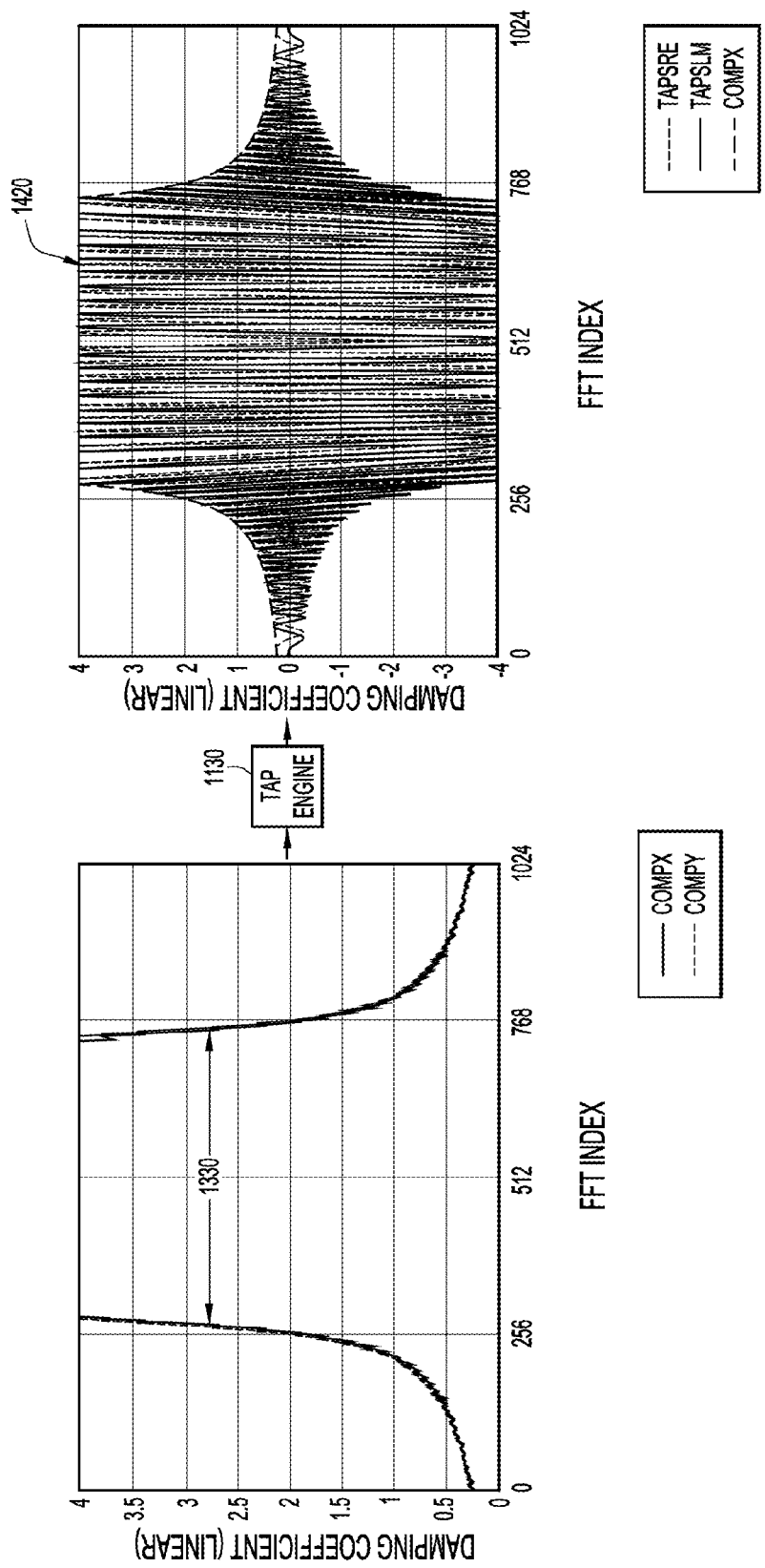
FIG. 14 illustrates the results of operations to determine chromatic dispersion tap weights, according to an example embodiment.

Reference is now made to FIG. 14, which illustrates in more detail the operations of the tap engine 1130 shown in FIG. 11, according to an embodiment. Reference may also be made to FIGS. 1, 4, 5, 7, 11, 12, 13A, and 13B in connection with the description of FIG. 14. Initially, compensation function 1330, which, as discussed above in connection with FIGS. 13A and 13B, may be determined as the difference between target function 1320 and frequency spectrum 1310 is fed into tap engine 1130. According to an embodiment, tap engine 1130 may determine the overall FIR filter coefficients used in 420, and specifically in 1135, from the compensation function 1330 and the quadratic phase response of chromatic dispersion that is being compensated. According to a further embodiment, the compensation damping coefficients 1420 for the X-polarization and Y-polarization could have different values and could include separate damping coefficients for each polarization for both the in-phase and quadrature components, viz., XI, XQ, YI and YQ. Tap engine 1130 may determine the CD tap weights by multiplying the compensation damping coefficients 1420 (linearly rather than in dB) by the quadratic phase response of the chromatic dispersion. After determining the FIR tap weights, tap engine 1130 may feed the FIR tap weights back into CD filter 420. According to an embodiment, CD filter may be a multi-tap FIR filter. That is, tap engine 1130 may determine tap weights for CD filter 420 to compensate optical signal for impairments related to chromatic dispersion by: (i) measuring frequency spectrum 1310; (ii) determining a compensation function as the inverse of frequency spectrum 1310; and (iii) multiplying the quadratic phase response of the chromatic dispersion by the determined compensation function. In one example, damping coefficients 1420 are computed within 500 ns using state machine hardware. This assists in CD search and real-time optimization.

Figures 15A, 15B:
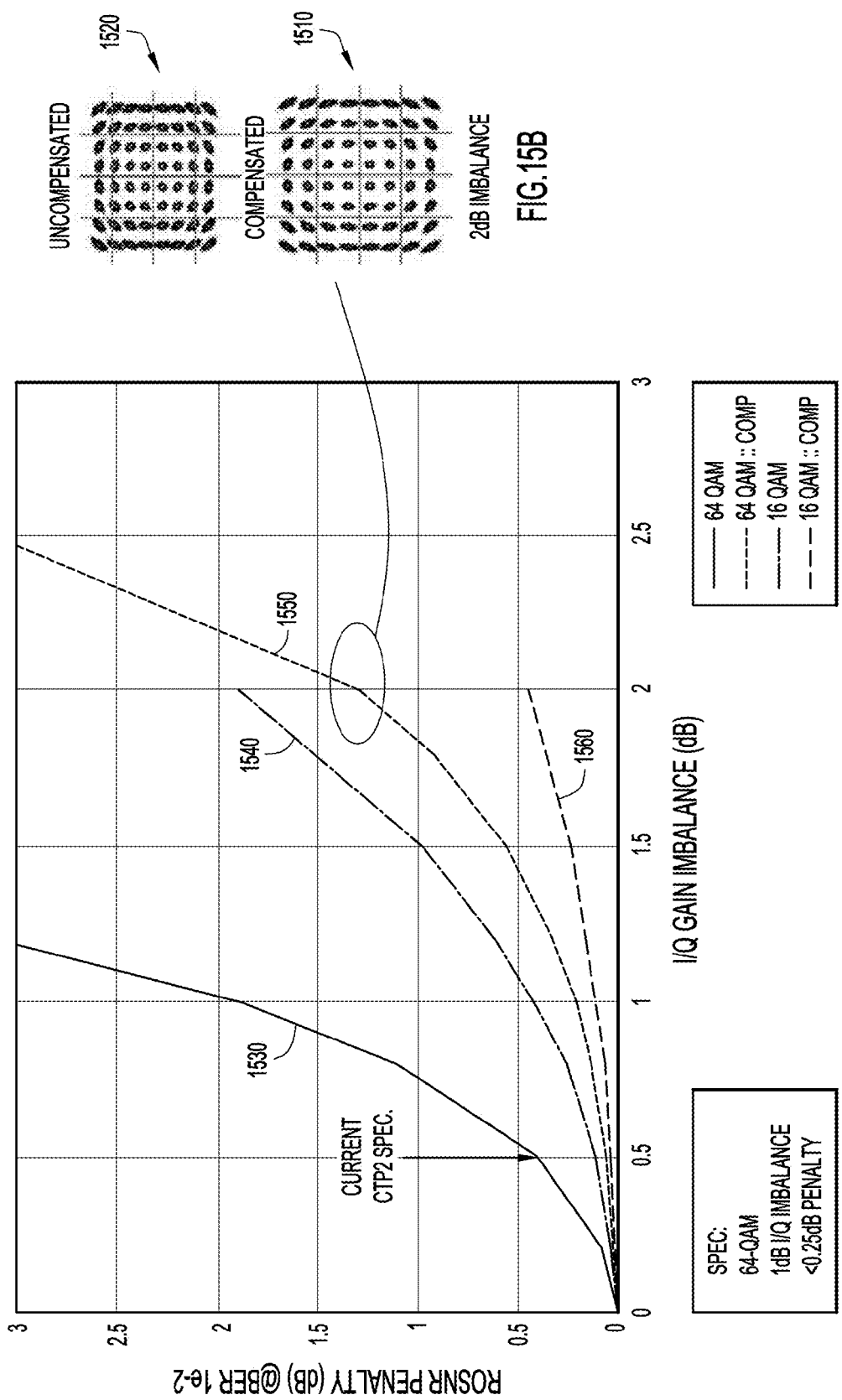
FIGS. 15A and 15B illustrate simulation results showing improvements in optical noise penalty due to operations performed to compensate for IQ gain imbalance errors due to receiver imperfections, according to an example embodiment.

Reference is now made to FIGS. 15A and 15B, which show simulation results 1500 illustrating improvements in optical noise penalty due to operations performed to compensate a received optical signal for impairments related to IQ gain imbalance due to receiver imperfections, according to an embodiment. Reference may also be made to FIG. 1 in connection with the description of FIGS. 15A and 15B. Simulation results 1500 show a constellation 1510 comprising 64 points, representing a 64-QAM symbol stream, that has been compensated for impairments related to IQ gain imbalance according to the techniques presented herein, and a constellation 1520 having 64 points that has not been compensated for impairments related to IQ gain imbalance. Simulation results 1500 also graphically illustrate the optical signal noise penalty for various levels of IQ gain imbalances, including noise penalty 1530 for an uncompensated signal comprising a constellation having 64 points, noise penalty 1550 for an uncompensated signal comprising a constellation having 16 points, representing a 16-QAM symbol stream, noise penalty 1540 for a compensated signal comprising a constellation having 64 points, and noise penalty 1560 for a compensated signal comprising a constellation having 16 points.

As shown in FIGS. 15A and 15B, the constellation points in constellation 1510 for a 64-QAM constellation having 64 points and a 2 dB IQ gain imbalance are evenly spaced because the IQ compensation techniques discussed herein have reduced or eliminated the IQ gain imbalance. Reference may also be made to FIG. 1 in connection with the description of FIGS. 15A and 15B. Conversely, the constellation points in constellation 1520 for a QAM constellation having 64 points and a 2 dB IQ gain imbalance are "compressed" together because no compensation has been applied to reduce the in-phase and quadrature gain imbalance, reducing the distance between individual constellation points. Thus, compensating optical signal for IQ gain impairments increases the distance between points in a QAM constellation, reducing the noise penalty for a given IQ gain imbalance. For example, for a 64 point QAM constellation having an IQ gain imbalance of 1 dB, the noise penalty 1530 for an uncompensated signal is approximately 2 dB, whereas the noise penalty 1550 for a compensated signal is reduced to approximately 0.25 dB and in some cases less than 0.1 dB. Similarly, for a 16 point QAM constellation having an IQ gain imbalance of 2 dB, the noise penalty 1540 for an uncompensated signal is approximately 1.3 dB, whereas the noise penalty 1560 for a compensated signal is reduced to approximately 0.45 dB. Accordingly, the IQ gain imbalance compensation techniques significantly improve overall performance.

Figures 16A, 16B:
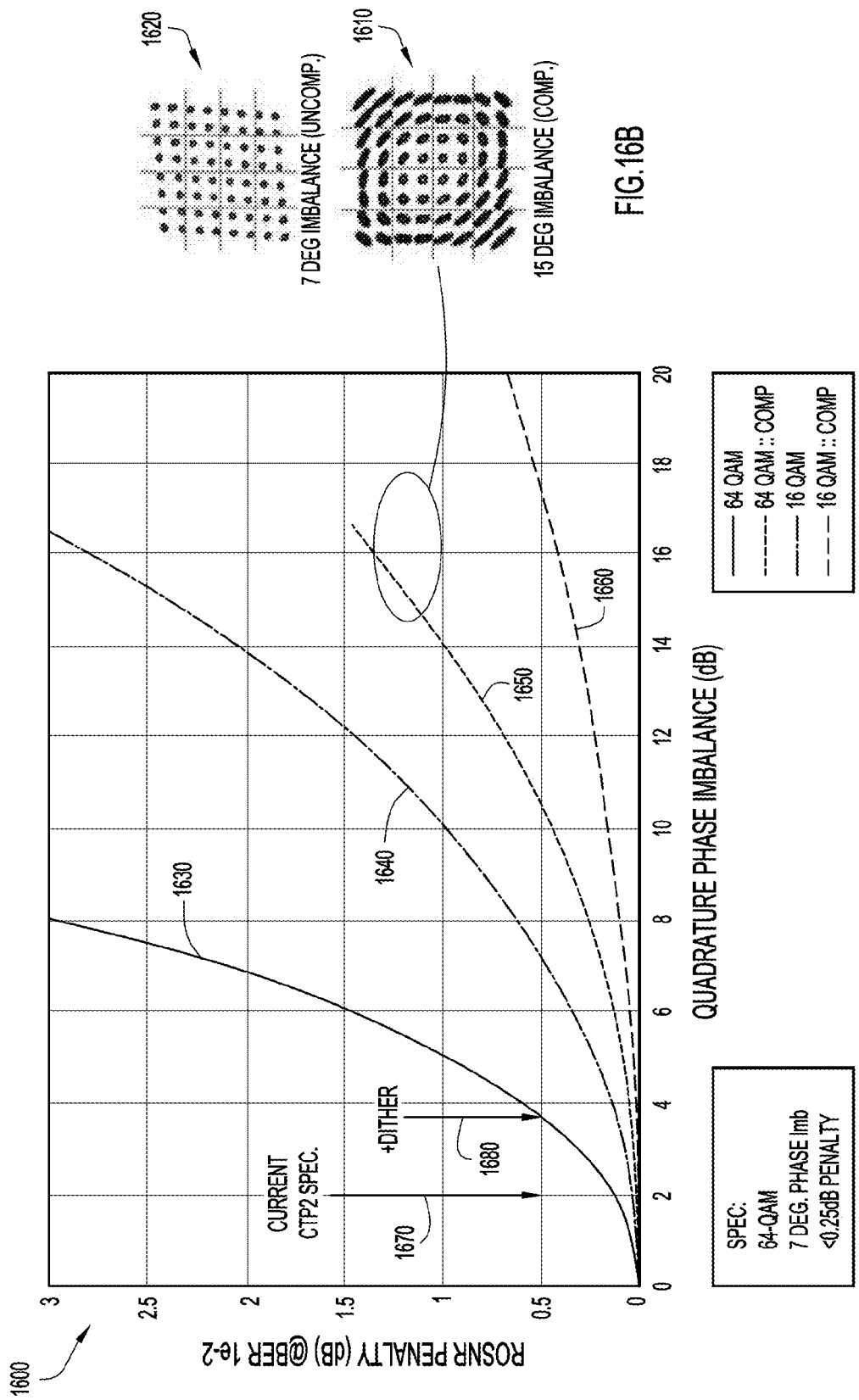
FIGS. 16A and 16B illustrate simulation results showing improvements in optical noise penalty due to operations performed to compensate for IQ quadrature phase errors due to receiver imperfections, according to an example embodiment.

Reference is now made to FIGS. 16A and 16B, which show simulation results 1600 illustrating improvements in optical noise penalty using operations presented herein to compensate a received optical signal for impairments related to IQ quadrature phase errors due to receiver imperfections, according to an embodiment. Reference may also be made to FIG. 1 in connection with the description of FIGS. 16A and 16B. Simulation results 1600 show a constellation 1610 comprising 64 points, representing a 64-QAM symbol stream, that has been compensated for impairments related to IQ quadrature phase error and a constellation 1620 having 64 points that has not been compensated for impairments related to IQ quadrature phase error. Simulation results 1600 also graphically illustrate the optical signal noise penalty for various levels of IQ quadrature phase imbalances, including noise penalty 1630 for an uncompensated signal comprising a constellation having 64 points, noise penalty 1640 for an uncompensated signal comprising a constellation having 16 points, noise penalty 1650 for a compensated signal comprising a constellation having 64 points, and noise penalty 1660 for a compensated signal comprising a constellation having 16 points.

As shown in FIGS. 16A and 16B, the constellation points in constellation 1610 for a QAM constellation having 64 points and a 15 degree phase imbalance are approximately centered around the origin because the IQ compensation techniques discussed herein have reduced or eliminated the IQ quadrature phase error. Conversely, the constellation points in constellation 1620 for a QAM constellation diagram having 64 points and only a seven degree quadrature phase imbalance are skewed upwards because no compensation has been applied to reduce the quadrature phase imbalance, reducing the maximum baud rate supported by the constellation. Thus, compensating a received optical signal for IQ quadrature phase errors increases system performance, reducing the noise penalty for a given IQ quadrature phase error. For example, for a 64 point QAM constellation having a quadrature phase error of seven degrees, the noise penalty 1630 for an uncompensated signal is approximately 2.1 dB, whereas the noise penalty 1650 for a compensated signal is reduced to approximately 0.25 dB. Similarly, for a 16 point QAM constellation having a quadrature phase error of 15 degrees, the noise penalty 1640 for an uncompensated signal is approximately 2.4 dB, whereas the noise penalty 1660 for a compensated signal is reduced to approximately 0.4 dB. The impairments to system performance due to quadrature phase error may be exacerbated because many manufacturers of optical transceivers often have a dither shown at 1680 of approximately 2-4 degrees associated with optical modulator control algorithms, increasing the total quadrature phase error of the transmitted signal. For example, while the specification 1670 of a pluggable transceiver may require no more than two degrees of IQ quadrature phase error, the dither associated with the transceiver may add an additional two degrees of quadrature phase error, increasing the noise penalty from 0.2 dB to 0.6 dB.

Reference is now made to FIGS. 17A and 17B, which show simulation results 1700 illustrating improvements in optical noise penalty due to operations presented herein that compensate for IQ offset errors due to receiver imperfections, according to an embodiment. Reference may also be made to FIG. 1 in connection with the description of FIGS. 17A and 17B. Simulation results 1700 show a constellation 1710 comprising 64 points having an IQ offset of −17 dB that has been compensated for impairments related to the IQ offset. Simulation results 1700 also graphically illustrate the optical signal noise penalty for various levels of IQ offset, including noise penalty 1720 for an uncompensated signal comprising a constellation having 64 points, noise penalty 1730 for an uncompensated signal comprising a constellation having 16 points, noise penalty 1740 for a compensated signal comprising a constellation having 64 points, and noise penalty 1750 for a compensated signal comprising a constellation having 16 points.

As illustrated in FIGS. 17A and 17B, the constellation points in constellation 1710 for a QAM constellation having 64 points and an IQ offset of −17 are approximately centered around the origin because the IQ compensation techniques presented herein have reduced or eliminated the IQ offset errors. Thus, compensating a received optical signal for IQ offset errors increases system performance, thereby reducing the noise penalty for a given IQ offset error. For example, for a 64 point QAM constellation having an IQ offset of −25 dB, the noise penalty 1720 for an uncompensated signal is approximately 3 dB, whereas the noise penalty 1730 for a compensated signal is reduced to approximately 0.25 dB. Similarly, for a 16 point QAM constellation having an IQ offset of −20 dB, the noise penalty 1740 for an uncompensated signal is approximately 1.8 dB, whereas the noise penalty 1750 for a compensated signal is reduced to approximately 0.2 dB.

Figure 18:
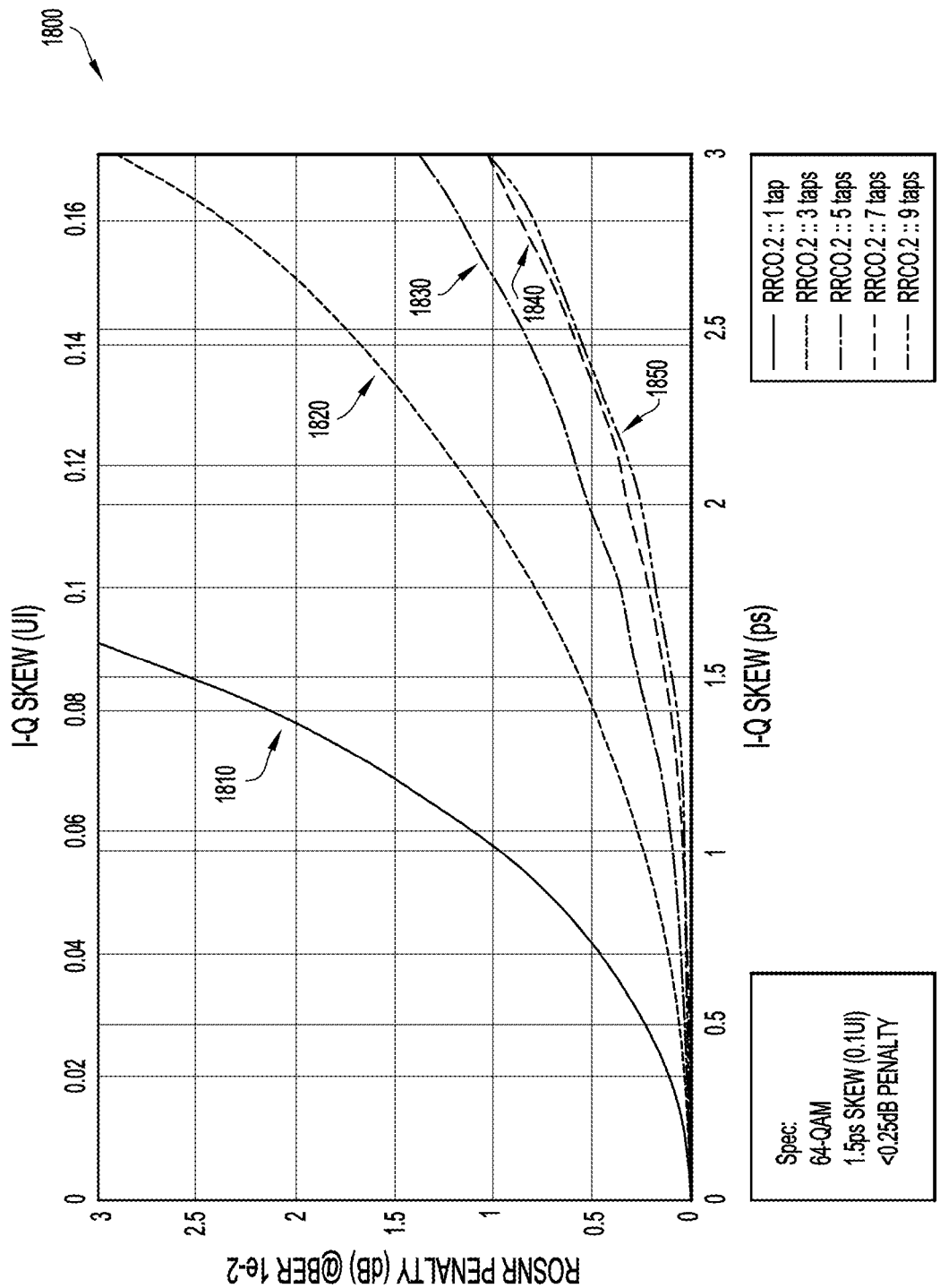
FIG. 18 illustrates simulation results showing improvements in optical noise penalty due to operations performed to compensate for IQ skew errors due to receiver imperfections, according to an example embodiment.

Reference is now made to FIG. 18, which shows simulation results 1800 illustrating improvements in optical noise penalty due by using operations presented herein to compensate for IQ skew errors due to receiver imperfections, according to an embodiment. Reference may also be made to FIG. 1 in connection with the description of FIG. 18. Simulation results 1800 graphically illustrate the optical signal noise penalty for varying numbers of filter taps (hii, hqi, hiq, hqq (shown as 850, 855, 860 and 865 in FIG. 8) and used to compensate a received optical signal for IQ skew errors, including noise penalty 1810 for a single compensation tap, noise penalty 1820 for three compensation taps, noise penalty 1830 for five compensation taps, noise penalty 1840 for seven compensation taps, and noise penalty 1850 for nine compensation taps. As shown in FIG. 18, the noise penalty for a given IQ skew may be reduced by increasing the number of compensation taps. For example, at an IQ skew of 1.4 ps, the noise penalty 1810 when using a single compensation tap is approximately 2.2 dB, while the noise penalty 1820 when using three taps is reduced to 0.5 dB and the noise penalty 1830 when using five taps is further reduced to approximately 0.25 dB. The noise penalties 1840 and 1850, using seven taps and nine taps respectively, are the same at an IQ skew of 1.4 ps, each approximately equal to 0.1 dB.

Figure 19:
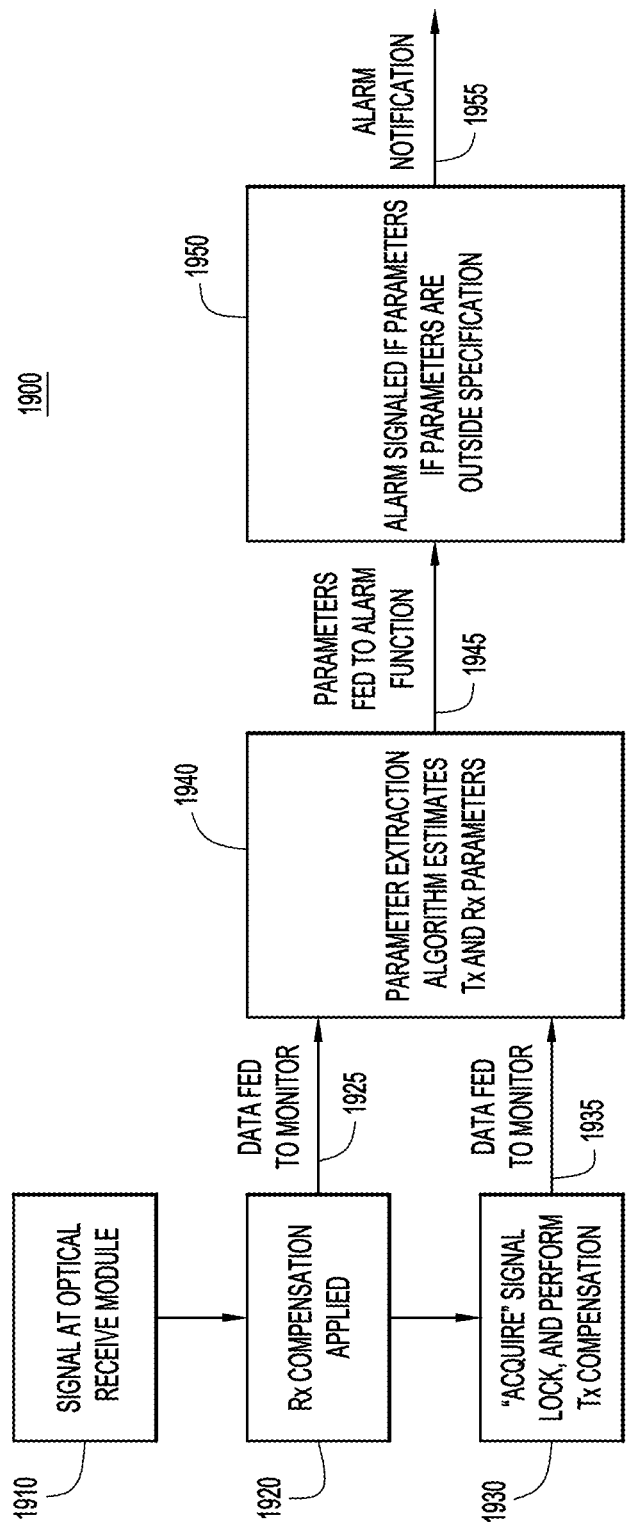
FIG. 19 illustrates a flow diagram of a process to perform parameter estimation and alarm monitoring, according to an example embodiment.

Reference is now made to FIG. 19, which shows a process 1900 to perform parameter estimation and alarm monitoring using the signal processing techniques described above, according to an example embodiment. Reference may also be made to FIGS. 1, 4 and 5 in connection with the description of FIG. 19. At 1910, receive module 122 receives an optical signal and converts the optical signal to an electrical signal that is forwarded to receiver DSP 125. At 1920, the receiver DSP 125 may estimate impairments to the received optical signal related to imperfections in receive module 122 and apply signal processing algorithms to compensate the electrical signal derived from the received optical signal for the receiver impairments. At 1925, receiver DSP 125 forwards data related to the imperfections in receive module 122 to monitoring module 128. At 1930, receiver DSP 125 may attempt to acquire synchronization with the received signal to derive the pilot symbols included in the received signal. If the receiver DSP 125 successfully acquires synchronization, it may estimate impairments related to imperfections in the transmit module 132 and apply signal processing algorithms to compensate the received signal for the transmitter impairments. At 1935, receiver DSP 125 forwards data related to the imperfections in transmit module 132 to monitoring module 128.

At 1940, monitoring module 128 may analyze the data related to imperfections in receive module 122 and/or imperfections in transmit module 132 to estimate one or more operational parameters associated with receive module 122 and/or transmit module 132, such as the transmitter IQ gain imbalance. At 1945, monitoring module 128 forwards the estimated operational parameters to an alarm function that may be embodied by a software residing in memory 150 and executed by processor 140. At 1950, the alarm function compares the estimated one or more operational parameters with operational specifications for receive module 122 and/or transmit module 132 to determine whether any of the one or more estimated operational parameters is not within a predetermined range of the corresponding operational specification, and, if so, generates an alarm signal. At 1955, the alarm function may generate an alarm to indicate that receive module 122 and/or transmit module 132 is not functioning properly. This alarm may be transmitted to a remote network administrator application 190 as shown in FIG. 1.

Figure 20:
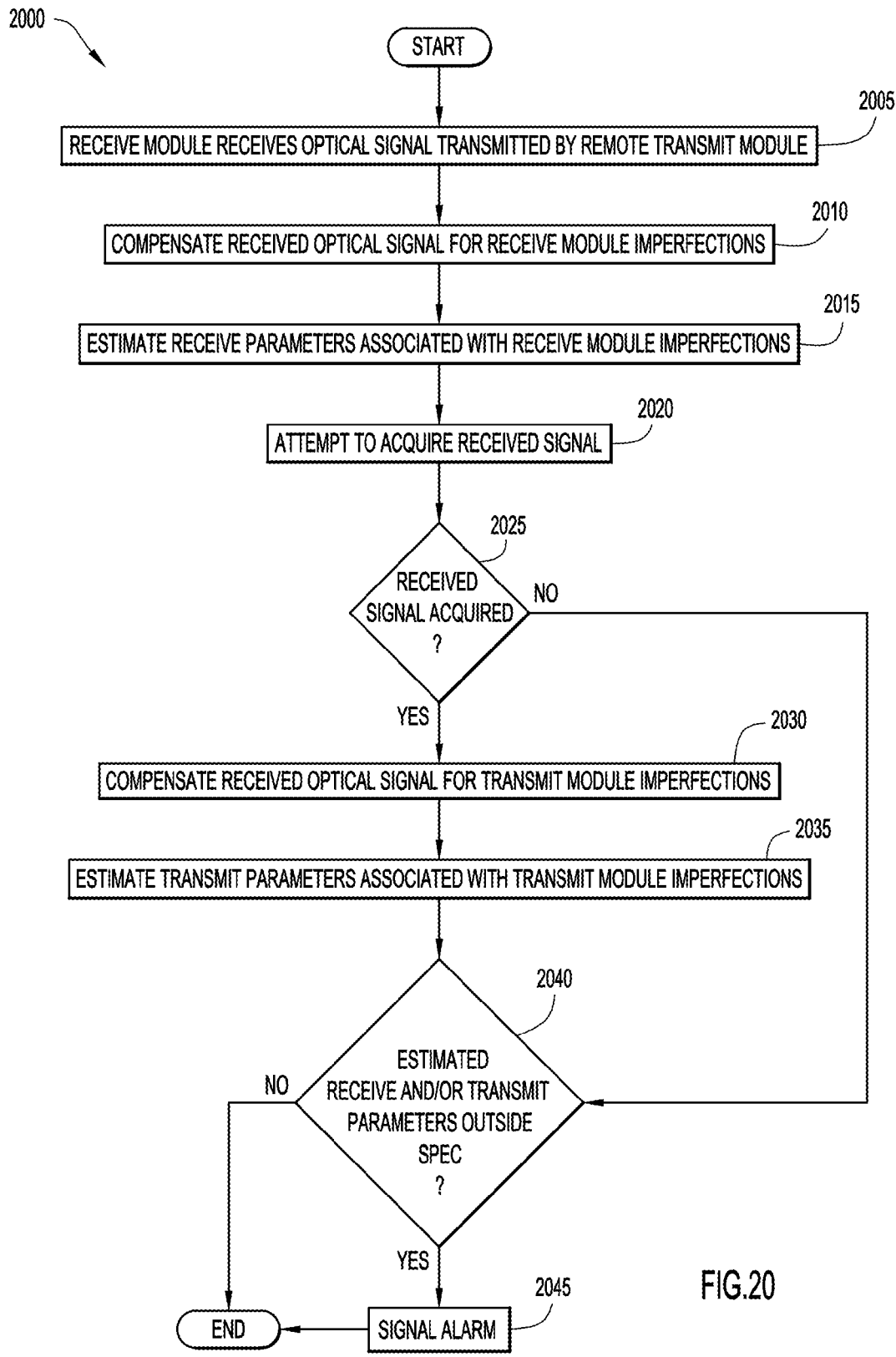
FIG. 20 illustrates a flowchart depicting operations to perform parameter estimation and alarm monitoring, according to an example embodiment.

With reference to FIG. 20, a flowchart is shown depicting operations of a process 2000 to perform parameter estimation and alarm monitoring, according to an embodiment. Reference may also be made to FIGS. 1, 4 and 5 in connection with the description of FIG. 20. At 2005, receive module 122 in a first optical device receives an optical signal transmitted by transmit module 132 in a second optical device. At 2010, receiver DSP 125 of the first optical device compensates (an electrical signal representing) the received optical signal for impairments related to imperfections in receive module 122. At 2015, operational parameters associated with receive module 122 are estimated. At 2020, receiver DSP 125 attempts to acquire synchronization to the received optical signal. If receiver DSP 125 successfully acquired synchronization the received optical signal, then processing proceeds to 2030, otherwise processing proceeds to 2040. At 2030, receiver DSP 125 compensates (the electrical signal representing) the received optical signal for impairments related to imperfections in transmit module 132. At 2035, operational parameters associated with transmit module 132 are estimated. At 2040, monitoring module 128 determines whether any of the estimated receive parameters and/or transmit parameters are outside predetermined operating ranges/limits (e.g., outside of compliance with a corresponding specification). If monitoring module 128 determines that at least one of the estimated receive and/or transmit parameters is outside a predetermined limit/range, processing proceeds to 2045, otherwise the process 2000 ends. At 2045, an alarm is signaled indicating that receive module 122 and/or transmit module 132 is not functioning properly, and process 2000 ends. As explained above, an alarm indication may be sent to the network administrator application 170 that may be remote from the first optical device and/or the second optical device. It should be understood that the second optical device may perform the process 2000 as well, and that the foregoing description was arbitrarily made from the perspective of the first optical device as an example only.

Figure 21:
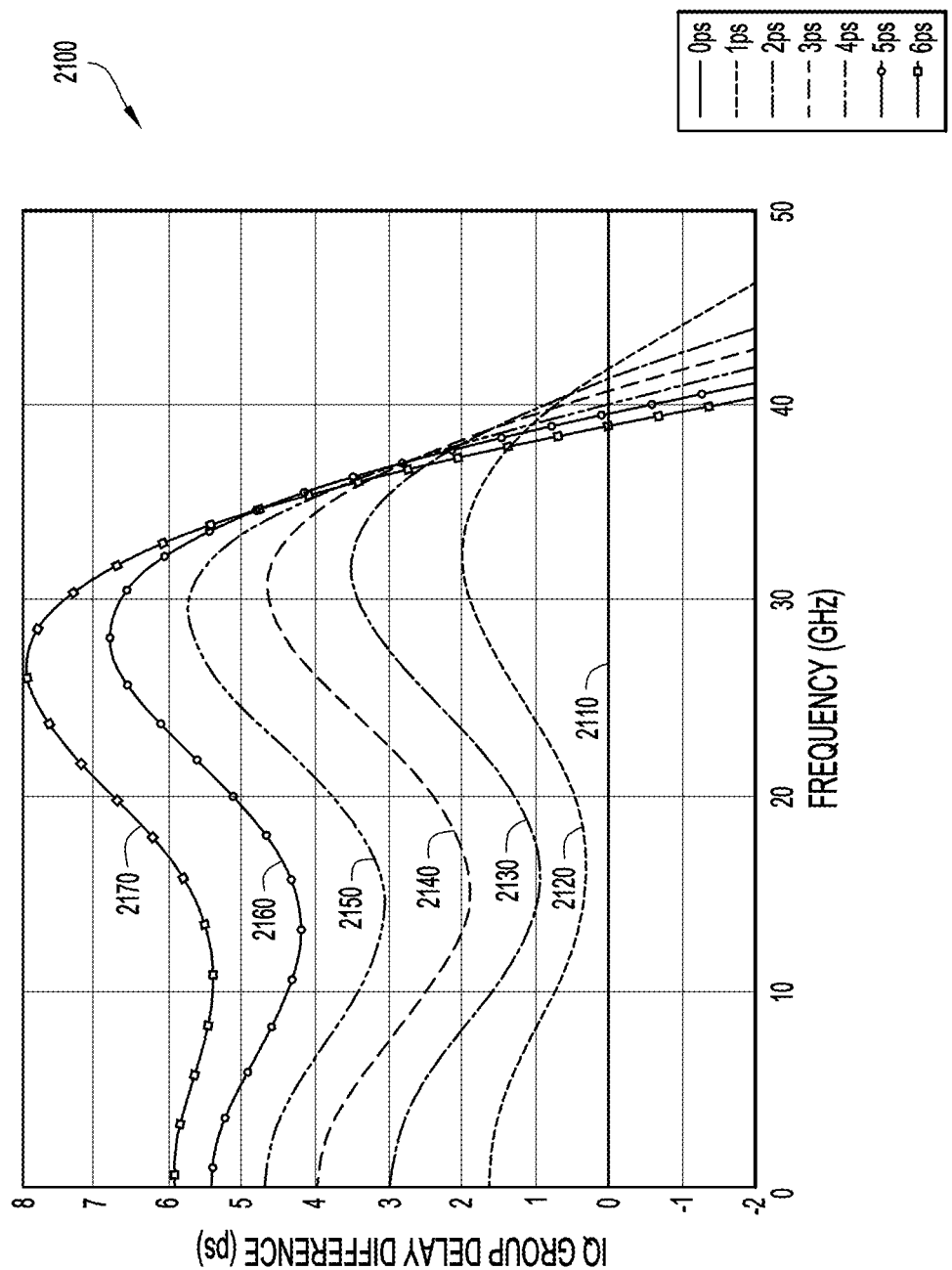
FIG. 21 illustrates simulation results showing IQ skew errors due to transmitter imperfections for a given Nyquist frequency range, according to an example embodiment.

Reference is now made to FIG. 21, which illustrates simulation results 2100 showing IQ group delay differences between an in-phase filter and a quadrature filter over time for a given Nyquist frequency range. Reference may also be made to FIGS. 1, 4, 5 and 8 in connection with the description of FIG. 21. According to an embodiment, IQ group delay difference may be determined as the group delay difference between in-phase hii filter 850 and quadrature hqq filter 865 (shown in FIG. 8) over the given Nyquist frequency range, wherein the group delay of a filter may be determined as:

$$GD_{ii}(\omega) = \frac{dH_{ii}(\omega)}{d\omega} H_{ii}(\omega)^{-1}$$ [Equation 7]

$$= T \cdot \mathfrak{R}_e \left\{ \frac{FFT(h_{ii} \cdot [0:M])}{FFT(h_{ii})} \right\}$$

The group delay difference between two filters measures the difference in time shifts for the in-phase and quadrature signals. According to an embodiment, the IQ skew may be determined from the group delay difference between the hii and hqq filters, which may be determined as:

$$GD(\omega) = GD_{ii}(\omega) - GD_{qq}(\omega)$$ [Equation 8]

As shown in FIG. 21, the frequency dependent group delay difference may provide a good estimate for the IQ timing skew. e.g., by averaging the IQ group delay difference (between hii and hqq filter) from 0 Hz to one-half the Nyquist frequency.

Figure 22:
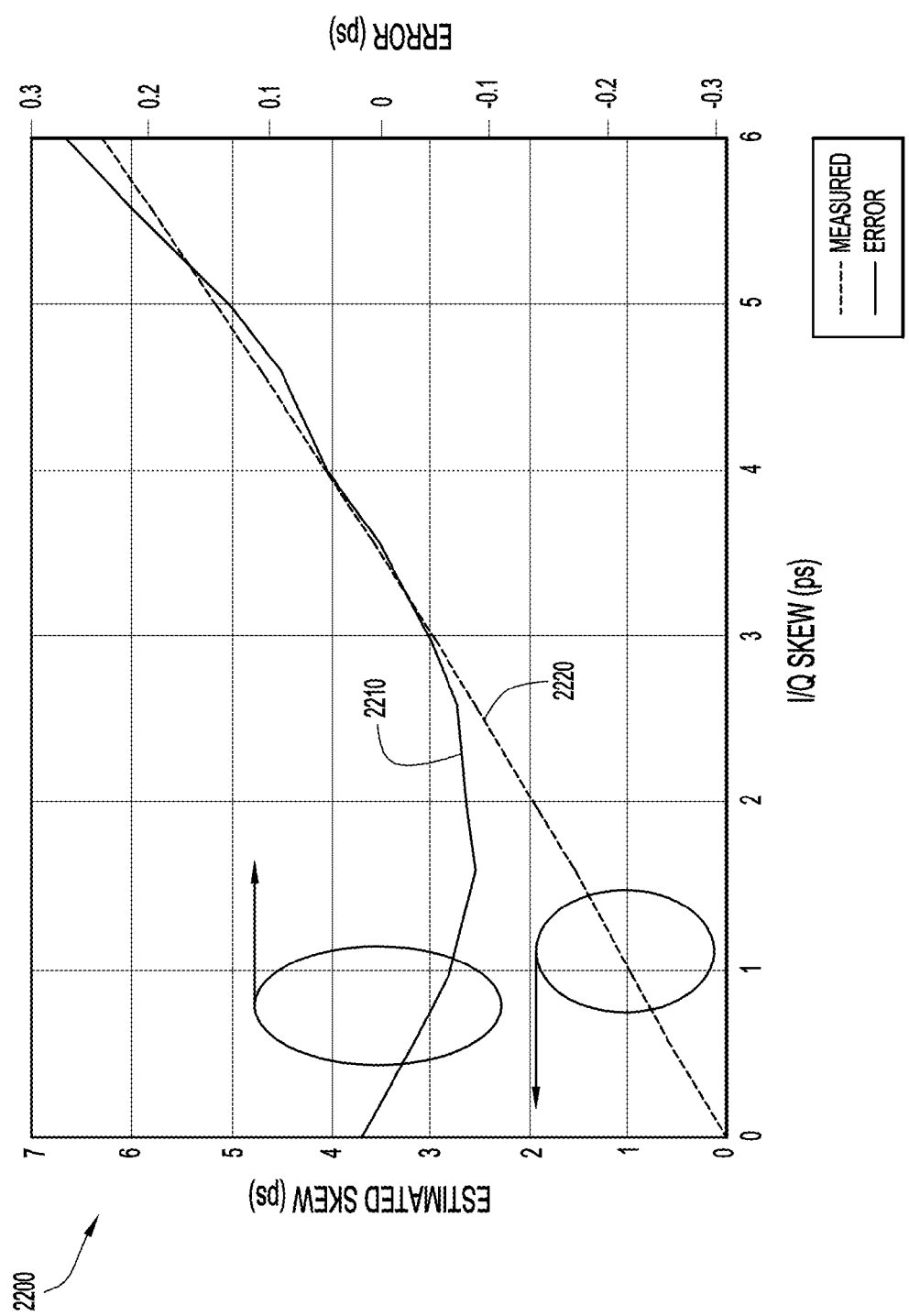
FIG. 22 illustrates simulation results showing the difference between estimated and measured IQ skew errors due to transmitter imperfections for a given Nyquist frequency range, according to an example embodiment.

Reference is now made to FIG. 22, which shows simulation results 2200 illustrating a difference between estimated IQ skew errors 2210 due to transmitter impairments and measured IQ skew errors 2220 for a given Nyquist frequency range, according to an embodiment. Reference may also be made to FIGS. 1, 4, 5 and 8 in connection with the description of FIG. 22. As discussed above with reference to FIG. 20, estimated IQ skew error 2210 may be determined as the group delay difference between in-phase hii filter 850 and quadrature hqq filter 865 (shown in FIG. 8). Simulation results shown in 2220 show that an IQ skew of up to 5 ps is accurately estimated. The error in estimation 2210 is less than +/−0.1 ps in a range of 0 to 5 ps skew. According to an embodiment, the IQ skew is automatically compensated by LMS module 840 (shown in FIG. 8). According to a further embodiment, the IQ skew value may be used to monitor and signal and alarm if it is over a pre-determined specification thresholds. According to a further embodiment, the IQ skew value may be returned to transmitter 130 via a return service channel, and the IQ skew may be corrected at transmitter 130.

Figure 23:
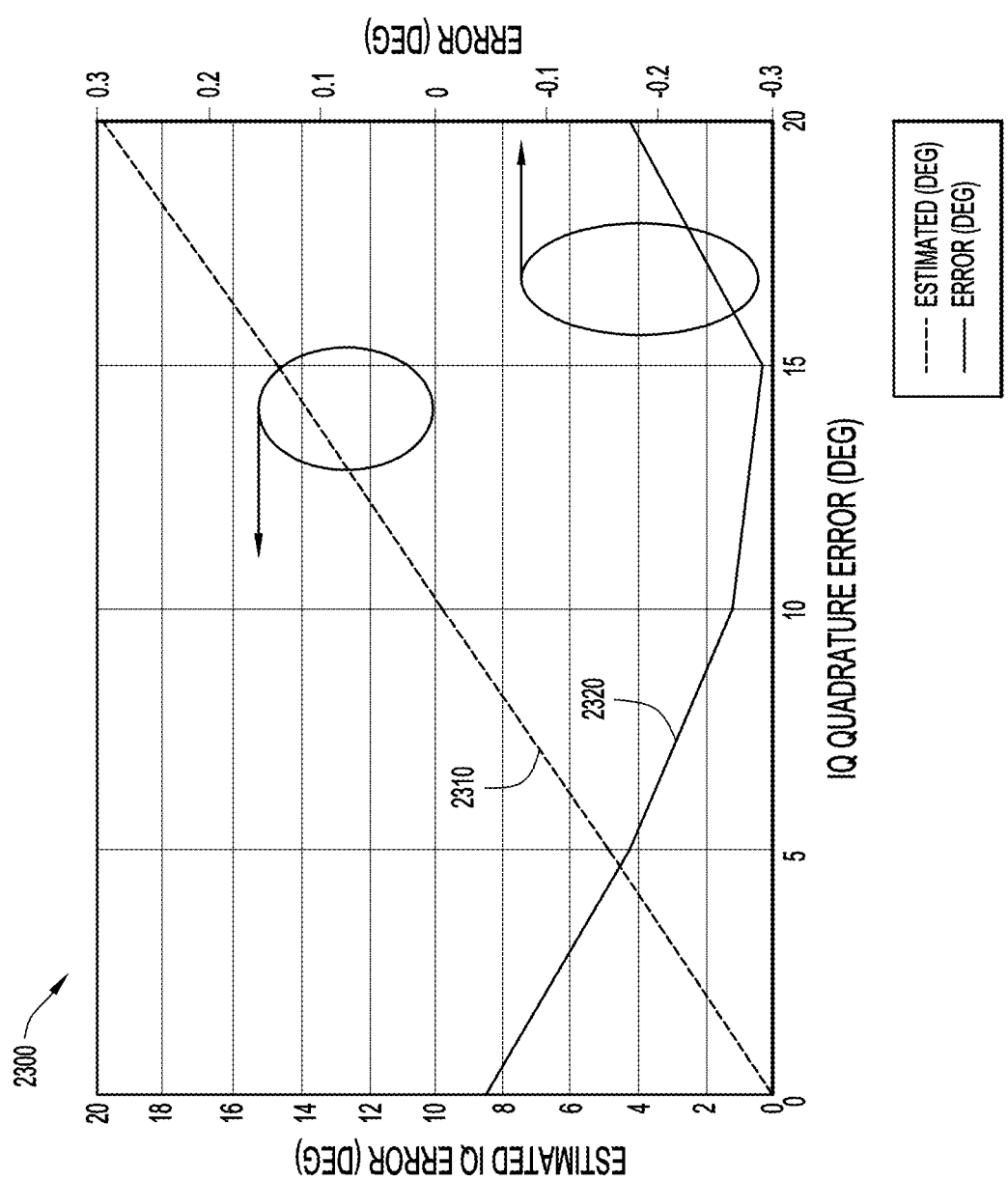
FIG. 23 illustrates simulation results estimating IQ quadrature errors in a received optical signal due to transmitter imperfections, according to an example embodiment.

Reference is now made to FIG. 23, which shows simulation results 2300 illustrating an estimate of the IQ quadrature errors due to transmitter impairments, according to an embodiment. Reference may also be made to FIGS. 1, 4, 5 and 8 in connection with the description of FIG. 23. As shown in FIG. 23, IQ quadrature error estimate 2310 represents the estimated IQ quadrature errors θ for actual IQ quadrature errors ranging from 0 degrees to 20 degrees. According to an embodiment, the tap weight pairs hqi and hii, and/or hiq and hqq, may be used to estimate the IQ quadrature error θ as:

$$\theta = 2\sin^{-1}\left(\frac{\sum h_{qi}}{\sum h_{ii}}\right)\frac{180}{\pi}$$ [Equation 9]

$$= 2\sin^{-1}\left(\frac{\sum h_{iq}}{\sum h_{qq}}\right)\frac{180}{\pi}$$

As is further illustrated in FIG. 23, error curve 2320 represents the estimation accuracy, which is the difference in the estimated IQ quadrature errors and the actual IQ quadrature errors for IQ quadrature errors θ ranging from 0 degrees to 20 degrees. According to simulation results 2300, the difference between the actual and estimated IQ quadrature errors, when the IQ quadrature error is 20 degrees, is less than 0.3 degrees, illustrating the accuracy and benefit of updating FIR filter tap weights to estimate IQ quadrature error θ.

Figure 24:
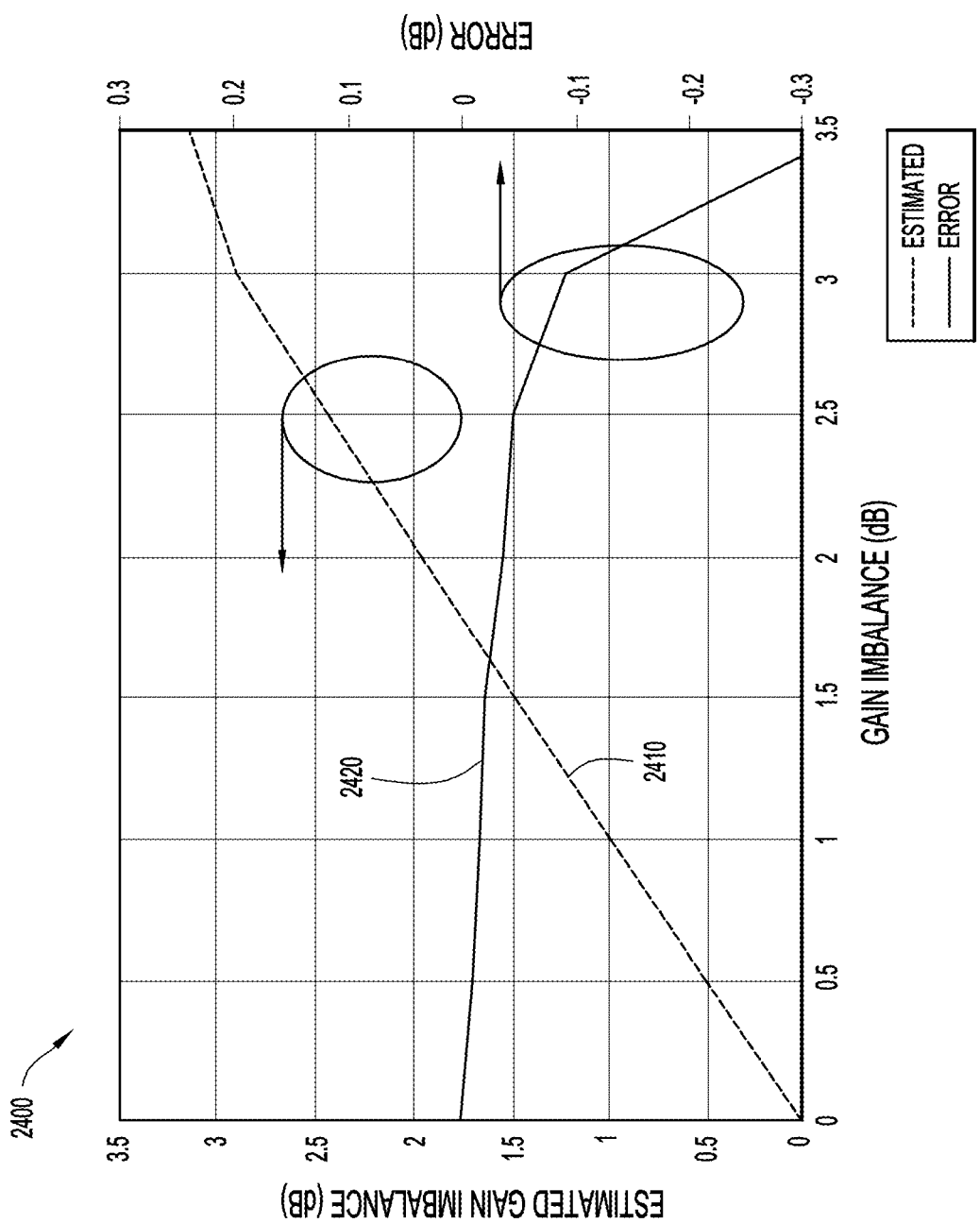
FIG. 24 illustrates simulation results estimating IQ gain mismatch errors in a received optical signal due to transmitter imperfections, according to an example embodiment.

Reference is now made to FIG. 24, which illustrates simulation results 2400 estimating IQ gain mismatch errors in a received optical signal due to transmitter impairments, according to an embodiment. Reference may also be made to FIGS. 1, 4, 5 and 8 in connection with the description of FIG. 24. As shown in FIG. 24, IQ gain imbalance estimate 2410 represents the estimated IQ gain imbalance $g_{dB}$ for IQ gain imbalances ranging from 0 dB to 3.5 dB. According to an embodiment, the tap weight pairs hqq and hii (for the aforementioned filters shown in FIG. 7) may be used to estimate the IQ gain imbalance as:

$$g_{dB} = 20\log_{10}\left(\frac{\sum h_{ii}}{\sum h_{qq}}\right) \quad \text{[Equation 10]}$$

As further illustrated in FIG. 24, error curve 2420 represents the difference in the estimated IQ gain imbalance $g_{dB}$ and the actual IQ gain imbalance for IQ gain imbalances ranging from 0 dB to 3.5 dB. According to simulation results 2400, the difference between the actual and estimated IQ gain imbalance, when the IQ gain imbalance is 3 dB, is less than 0.1 dB, illustrating the accuracy of updating FIR filter tap weights to estimate IQ gain imbalance $g_{dB}$.

Figure 25:
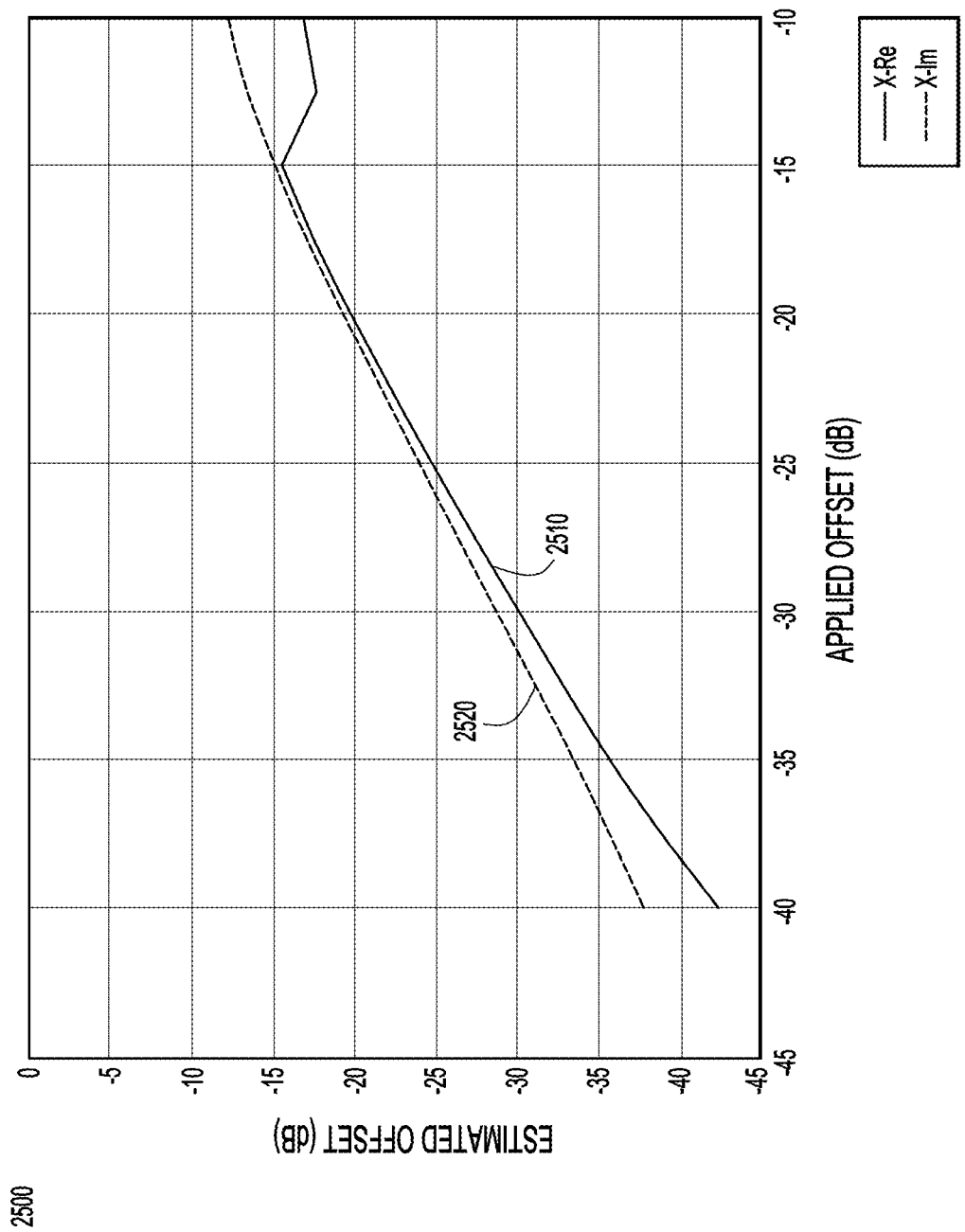
FIG. 25 illustrates simulation results estimating IQ offset errors in a received optical signal due to transmitter imperfections, according to an example embodiment.

Reference is now made to FIG. 25, which illustrates simulation results 2500 estimating IQ offset errors in a received optical signal due to transmitter impairments, according to an embodiment. Reference may also be made to FIGS. 1, 4, 5, 8 and 11 in connection with the description of FIG. 25. As shown in FIG. 25, IQ offset errors estimate 2510 represents the estimated offset errors for the in-phase, i.e., real, component of the x-polarization signal over applied IQ offset errors ranging from −45 dB to −10 dB. Similarly, IQ offset errors estimate 2520 represents the estimated offset errors for the quadrature, i.e., imaginary, component of the x-polarization signal over applied IQ offset errors ranging from −45 dB to −10 dB.

According to an embodiment, the estimated IQ offset errors, which are constant with respect to frequency, may determined directly from the output of the measure Offset blocks 710,720 in FIG. 7 As such, the estimated IQ offset errors may be determined as:

$$\text{offset}_{dB} = 20\log_{10}(\text{offset}_{lin}) - k \text{ where } k = \text{normalizing constant} \quad \text{[Equation 11]}$$

According to equation 14, IQ offset error may be adjusted by a normalizing constant k, which takes into account the power/position of the constellation associated with received signal. For example, the offset error estimated at 16 Gbs may be different than that estimated at 64 Gbs. As further shown in FIG. 25, according to simulation results 2500, the difference between the actual and estimated IQ gain imbalance, when the IQ gain imbalance is 3 dB, is less than 0.1 dB.

Figure 26:
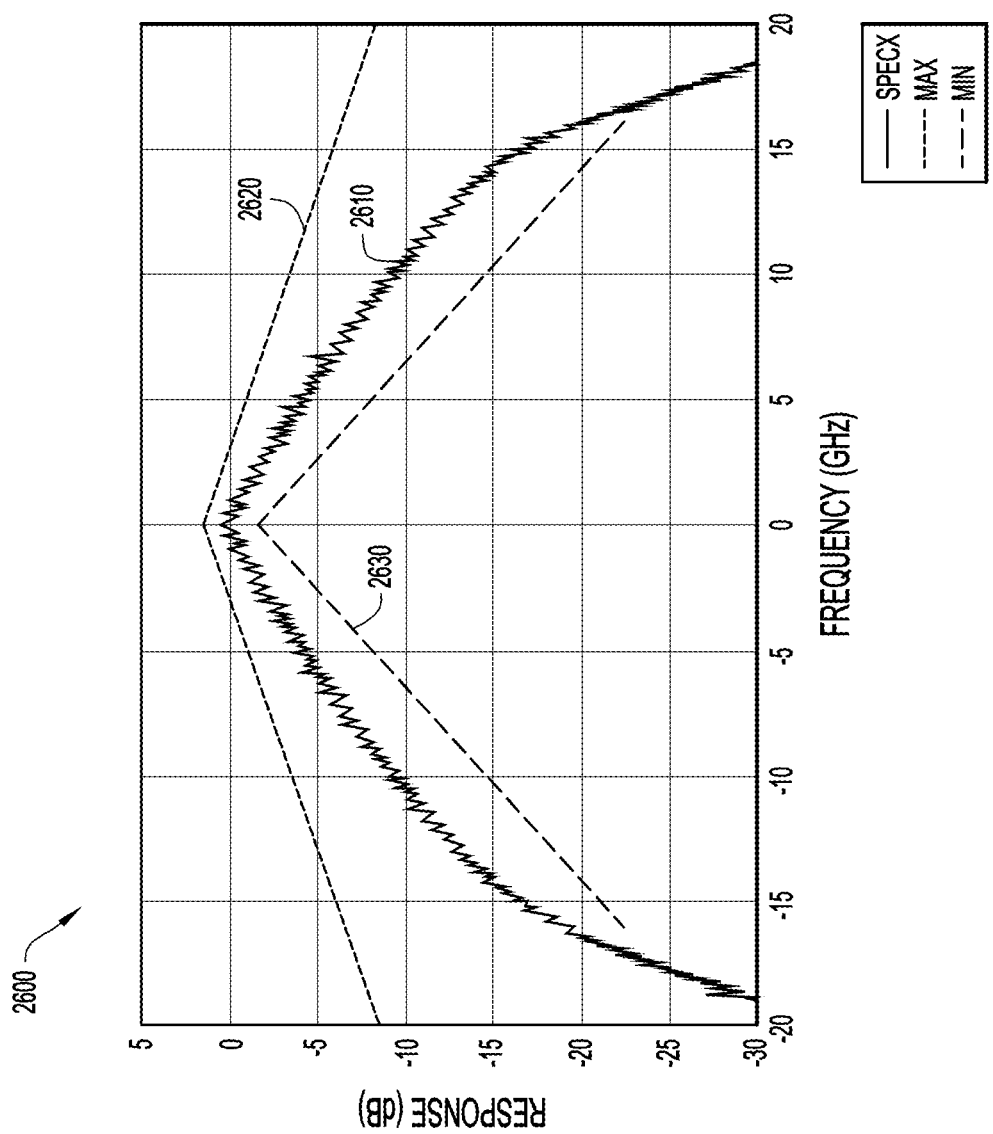
FIG. 26 illustrates simulation results estimating whether a system frequency response is within predefined maximum and minimum frequency levels, according to an example embodiment.

Reference is now made to FIG. 26, which illustrates simulation results 2600 showing a frequency spectrum 2610 within predetermined frequency response levels 2620 and 2630, according to an embodiment. Reference may also be made to FIGS. 1, 4, 5, 8 and 11 in connection with the description of FIG. 26. As shown in FIG. 26, frequency spectrum 2610 is a function of the frequency responses due to transmitter imperfections, receiver line-card imperfections, receive module 122 and transmit module 132. According to an embodiment, frequency spectrum 2610 may be measured at CD filter 420 using the data received from FFT module 1026. As further shown in FIG. 26, frequency response 2620 represents the maximum allowable frequency response of spectrum 2610 over a given Nyquist frequency range, and frequency response 2630 represents the minimum allowable frequency response of spectrum 2610. According to an embodiment, if frequency spectrum 2610 is above frequency response 2620, or below frequency response 2630, monitoring module 128 may generate an alarm indication to signal that the system frequency spectrum is not within predefined specifications.

The system and method disclosed herein estimate one or more operational parameters associated with optical transceivers to mitigate impairments to an optical signal caused by imperfections in the optical transceivers. A monitoring algorithm within a receiver DSP may use the estimates for one or more operational parameters associated with the pluggable optical transceivers to determine whether the transceivers are performing correctly. If the monitoring algorithm determines that either the transmitting or the receiving optical transceiver is not functioning correctly, it may generate an alarm signal to notify a system administrator about the damaged or otherwise improperly functioning device.

The system and method disclosed herein further automatically compensate for impairments to a received optical signal by continuously updating, at the receiver, the tap weights associated with FIR filters used to equalize in-phase and quadrature signals. In so doing, receiver DSP 125 is able to continuously update its estimates for the operational parameters associated with the receiving and transmitting optical transceivers while compensating, in real-time, the received signal for impairments caused by the imperfections in the optical transceivers. Furthermore, monitoring module 128 may use the continuously updated estimates for the operational parameters associated with the receiving and transmitting optical transceivers to determine whether to generate an alarm indicating that one or more of the operational parameters are outside predetermined tolerance levels. While the estimates for the operational parameters associated with the receiving and transmitting optical transceivers may be fed back to transmitter 130, e.g., via a return channel, to correct impairments to a received optical signal associated with the one or more operational parameters, it is preferable that receiver 120 directly compensate the signal impairments to the received optical signal.

Advantages of the embodiments presented herein include reducing the costs associated with maintaining optical communication systems, while enhancing the flexibility and scalability offered by pluggable optical transceiver modules. For example, system/network administrators are automatically notified, in real-time, whether a pluggable optical transceiver is defective, or not within specification tolerances, allowing the administrator to quickly replace the defective module. Furthermore, by providing mechanisms to automatically compensate for signal impairments at the receiving device, the disclosed method and system increase performance and overall throughput rates for the optical communication system.

In one form, a method is provided comprising: at a first optical device including an optical receiver module: receiving, at the optical receiver module, an optical signal transmitted by an optical transmitter module of a second optical device, to produce a receive signal; receive processing of the receive signal to recover data in the receive signal, wherein receive processing includes compensating the receive signal to account for impairments, if any, of the optical transmitter module of the second optical device; estimating one or more transmit parameters associated with the optical transmitter module of the second optical device based on the compensating applied to the receive signal to account for impairments of the optical transmitter module of the second optical device; and monitoring the one or more transmit parameters to determine whether any transmit parameter is outside a predetermined tolerance level.

In another form, an apparatus is provided comprising: an optical receiver configured to receive an optical signal transmitted by an optical transmitter of another optical device to produce a receive signal; and a processor, coupled to the receiver, and configured to: process the receive signal to recover data in the receive signal, including compensating the receive signal to account for impairments, if any, of the optical transmitter of the other device; estimate one or more transmit parameters associated with the optical transmitter of the other optical device based on the compensating applied to the receive signal to account for impairments of the optical transmitter of the other optical device; and monitor the one or more transmit parameters to determine whether any transmit parameter is outside a predetermined tolerance level.

In another form, a non-transitory processor readable medium storing instructions is provided that, when executed by a processor, cause the processor to: at a first optical device, receive process a receive signal produced from an optical signal transmitted by an optical transmitter of a second optical device to recover data in the receive signal, wherein receive processing includes compensating the receive signal to account for impairments, if any, of the optical transmitter of the second optical device; estimate one or more transmit parameters associated with the optical transmitter of the second optical device based on the compensating applied to the receive signal to account for impairments of the optical transmitter of the second optical device; and monitor the one or more transmit parameters to determine whether any transmit parameter is outside a predetermined tolerance level.

In another form, a method is provided comprising: at a first optical device including an optical receiver module: receiving, at the optical receiver module, an optical signal transmitted by an optical transmitter module of a second optical device, to produce a receive signal; receive processing the receive signal to recover data in the receive signal, wherein receive processing includes compensating the receive signal to account for impairments, if any, of the optical receiver module of the first optical device; estimating one or more receive parameters associated with the optical receiver module of the first optical device based on the compensating applied to the receive signal to account for impairments of the optical receiver module of the first optical device; and monitoring the one or more receive parameters to determine whether any receive parameter is outside a predetermined tolerance level.

Similarly, an apparatus is provided comprising: an optical receiver configured to receive an optical signal transmitted by a transmitter of another optical device to produce a receive signal; and processor, coupled to the optical receiver, and configured to: process the receive signal to recover data in the receive signal, including compensating the receive signal to account for impairments, if any, of the optical receiver; estimate one or more receive parameters associated with the optical receiver based on the compensating applied to the receive signal to account for impairments of the optical receiver; and monitor the one or more receiver parameters to determine whether any receiver parameter is outside a predetermined tolerance level.

Still further, a non-transitory processor readable medium storing instructions that, when executed by a processor, cause the processor to: at a first optical device, receive process a receive signal produced from an optical signal transmitted by an optical transmitter of a second optical device to recover data in the receive signal, wherein receive processing includes compensating the receive signal to account for impairments, if any, of an optical receiver of the first optical device; estimate one or more receive parameters associated with the optical receiver of the first optical device based on the compensating applied to the receive signal to account for impairments of the optical receiver of the first optical device; and monitor the one or more receive parameters to determine whether any receive parameter is outside a predetermined tolerance level.

Notwithstanding the foregoing, also presented herein are techniques for correcting transmitter and receiver frequency response in chromatic dispersion filter. Further still, presented herein are techniques for determining transmitter and receiver optical component parameters from (a) direct measurement in the receiver DSP (through the use of constellation diagrams), and from equalizer parameters in a compensation algorithm.

Further yet, presented herein are techniques for monitoring transmitter and receiver optical component parameters and sending an alarm when they are out of specification.

The above description is intended by way of example only. Various modifications and structural changes may be made therein without departing from the scope of the concepts described herein and within the scope and range of equivalents of the claims.

What is claimed is:
1. A method comprising:
    at a first optical device including an optical receiver module:
        receiving, at the optical receiver module, an optical signal transmitted by an optical transmitter module of a second optical device, to produce a receive signal;
        receive processing the receive signal to recover data in the receive signal, wherein receive processing includes compensating the receive signal to account for impairments, if any, of the optical transmitter module of the second optical device by:
            determining an average value of an in-phase component of the receive signal and an average value of a quadrature component of the receive signal;
            determining an offset associated with the in-phase component of the receive signal based on the average value of the in-phase component of the receive signal;
            determining an offset associated with the quadrature component of the receive signal based on the average value of the quadrature component of the receive signal;
            calculating an offset-corrected in-phase component of the receive signal by subtracting the offset associated with the in-phase component from the in-phase component of the receive signal; and
            calculating an offset-corrected quadrature component of the receive signal by subtracting the offset associated with the quadrature component from the quadrature component of the receive signal;
        estimating one or more transmit parameters associated with the optical transmitter module of the second optical device based on the compensating applied to the receive signal to account for the impairments, if any, of the optical transmitter module of the second optical device; and monitoring the one or more transmit parameters to determine whether at least one of the one or more transmit parameters is outside a predetermined tolerance level.

2. The method of claim 1, further comprising triggering an alarm to indicate that the at least one of the one or more transmit parameters is outside the predetermined tolerance level.

3. The method of claim 1, wherein receiving the optical signal is performed by a pluggable optical receiver module, and the receive processing and the estimating are performed in a signal processing module to which the pluggable receiver module electrically connects.

4. The method of claim 3, wherein the monitoring is performed by software running on the signal processing module.

5. The method of claim 1, wherein receive processing further comprises:
compensating the receive signal to account for impairments, if any, of the optical receiver module of the first optical device; and
estimating one or more receive parameters associated with the optical receiver module of the first optical device based on the compensating applied to the receive signal to account for the impairments, if any, of the optical receiver module of the first optical device.

6. The method of claim 5, wherein compensating the receive signal to account for the impairments, if any, of the optical receiver module of the first optical device comprises:
generating a frequency spectrum associated with the receive signal;
sampling the frequency spectrum associated with the receive signal to determine an average value of the frequency spectrum associated with the receive signal;
calculating a compensation function associated with the receive signal based at least on the average value of the frequency spectrum associated with the receive signal; and
applying the compensation function to the receive signal.

7. The method of claim 6, wherein calculating the compensation function associated with the receive signal comprises determining a difference between the average value of the frequency spectrum associated with the receive signal and a predetermined target frequency spectrum.

8. The method of claim 7, wherein the predetermined target frequency spectrum is associated with either a root-raised cosine filter or a linear ramp function.

9. The method of claim 5, wherein compensating the receive signal to account for the impairments, if any, of the optical receiver module of the first optical device further comprises:
determining tap weight values associated with a compensation filter; and
applying the tap weight values to one or more inputs of the compensation filter.

10. The method of claim 9, wherein the compensation filter is a chromatic dispersion filter.

11. The method of claim 5, wherein monitoring further comprises monitoring the one or more receive parameters to determine whether at least one of the one or more receive parameters is outside a second predetermined tolerance level.

12. The method of claim 11, further comprising:
triggering an alarm to indicate that the at least one of the one or more receive parameters is outside the second predetermined tolerance level.

13. The method of claim 1, further comprising:
filtering the offset-corrected in-phase component of the receive signal using a first filter having a first associated gain function, wherein at least one output of the first filter is determined based on the first associated gain function;
filtering the offset-corrected quadrature component of the receive signal using a second filter having a second associated gain function, wherein at least one output of the second filter is determined based on the second associated gain function;
filtering the in-phase component of the receive signal using a third filter having a third associated gain function, wherein at least one output of the third filter is determined based on the third associated gain function;
filtering the quadrature component of the receive signal using a fourth filter having a fourth associated gain function, wherein at least one output of the fourth filter is determined based on the fourth associated gain function;
determining the in-phase component of the receive signal by adding the at least one output of the first filter to the at least one output of the second filter; and
determining the quadrature component of the receive signal by adding the at least one output of the third filter to the at least one output of the fourth filter.

14. The method of claim 13, wherein the first associated gain function and the third associated gain function are the same, and the second associated gain function and the fourth associated gain function are the same.

15. The method of claim 13, wherein the first filter, the second filter, the third filter, and the fourth filter are finite impulse response filters.

16. The method of claim 13, further comprising automatically determining filter parameters associated with the first, second, third, and fourth filters to minimize an error signal associated with the receive signal.

17. The method of claim 16, wherein the receive signal comprises predetermined pilot signals.

18. The method of claim 16, wherein estimating the one or more transmit parameters includes estimating the one or more transmit parameters based at least on the filter parameters associated with the first, second, third, and fourth filters.

19. An optical device comprising:
an optical receiver configured to receive an optical signal transmitted by an optical transmitter module of another optical device to produce a receive signal; and
a processor, coupled to the receiver, and configured to:
receive process the receive signal to recover data in the receive signal, including compensating the receive signal to account for impairments, if any, of the optical transmitter of the other optical device by:
determining an average value of an in-phase component of the receive signal and an average value of a quadrature component of the receive signal;
determining an offset associated with the in-phase component of the receive signal based on the average value of the in-phase component of the receive signal;
determining an offset associated with the quadrature component of the receive signal based on the average value of the quadrature component of the receive signal;
calculating an offset-corrected in-phase component of the receive signal by subtracting the offset associated with the in-phase component from the in-phase component of the receive signal; and calculating an offset-corrected quadrature component of the receive signal by subtracting the offset associated with the quadrature component from the quadrature component of the receive signal;

estimate one or more transmit parameters associated with the optical transmitter of the other optical device based on the compensating applied to the receive signal to account for the impairments, if any, of the optical transmitter of the other optical device; and monitor the one or more transmit parameters to determine whether at least one of the one or more transmit parameters is outside a predetermined tolerance level.

20. The optical device of claim 19, wherein the processor is further configured to trigger an alarm to indicate that the at least one of the one or more transmit parameters is outside the predetermined tolerance level.

21. The optical device of claim 19, wherein the processor is configured to receive process by:

compensating the receive signal to account for impairments, if any, of the optical receiver; and estimating one or more receive parameters associated with the optical receiver based on the compensating applied to the receive signal to account for the impairments, if any, of the optical receiver.

22. A non-transitory processor readable medium storing instructions that, when executed by a processor, cause the processor to:

at a first optical device, receive process a receive signal produced from an optical signal transmitted by an optical transmitter of a second optical device to recover data in the receive signal, wherein receive processing includes compensating the receive signal to account for impairments, if any, of the optical transmitter of the second optical device by:

determining an average value of an in-phase component of the receive signal and an average value of a quadrature component of the receive signal;

determining an offset associated with the in-phase component of the receive signal based on the average value of the in-phase component of the receive signal;

determining an offset associated with the quadrature component of the receive signal based on the average value of the quadrature component of the receive signal;

calculating an offset-corrected in-phase component of the receive signal by subtracting the offset associated with the in-phase component from the in-phase component of the receive signal; and calculating an offset-corrected quadrature component of the receive signal by subtracting the offset associated with the quadrature component from the quadrature component of the receive signal;

estimate one or more transmit parameters associated with the optical transmitter of the second optical device based on the compensating applied to the receive signal to account for the impairments, if any, of the optical transmitter of the second optical device; and monitor the one or more transmit parameters to determine whether at least one of the one or more transmit parameters is outside a predetermined tolerance level.

23. The processor readable medium of claim 22, wherein the instructions further cause the processor to trigger an alarm to indicate that the at least one of the one or more transmit parameters is outside the predetermined tolerance level.

24. The processor readable medium of claim 22, wherein the instructions that cause the processor to receive process the receive signal further comprise instructions operable to:

compensate the receive signal to account for impairments, if any, of an optical receiver of the first optical device; and estimate one or more receive parameters associated with the optical receiver of the first optical device based on the compensating applied to the receive signal to account for the impairments, if any, of the optical receiver of the first optical device.

25. The processor readable medium of claim 24, further comprising instructions that cause the processor to monitor the one or more receive parameters to determine whether at least one of the one or more receive parameters is outside a second predetermined tolerance level.

* * * * *